(12) United States Patent
Nielsen et al.

(10) Patent No.: US 7,526,165 B2
(45) Date of Patent: Apr. 28, 2009

(54) OPTICAL COUPLER DEVICES, METHODS OF THEIR PRODUCTION AND USE

(75) Inventors: Martin Dybendal Nielsen, Kgs. Lyngby (DK); Peter M. W. Skovgaard, Birkerod (DK); Jes Broeng, Birkerod (DK); Guillaume Vienne, Hangzhou (CN)

(73) Assignee: Crystal Fibre A/S, Birkerod (DK)

( * ) Notice: Subject to any disclaimer, the term of this patent is extended or adjusted under 35 U.S.C. 154(b) by 105 days.

(21) Appl. No.: 10/599,057

(22) PCT Filed: Mar. 21, 2005

(86) PCT No.: PCT/DK2005/000192

§ 371 (c)(1),
(2), (4) Date: Dec. 21, 2006

(87) PCT Pub. No.: WO2005/091029

PCT Pub. Date: Sep. 29, 2005

(65) Prior Publication Data

US 2007/0237453 A1    Oct. 11, 2007

Related U.S. Application Data

(60) Provisional application No. 60/575,091, filed on May 28, 2004, provisional application No. 60/554,373, filed on Mar. 19, 2004.

(30) Foreign Application Priority Data

Mar. 19, 2004 (DK) .................. 2004 00447
May 28, 2004 (DK) .................. 2004 00844

(51) Int. Cl.
*G02B 6/032* (2006.01)
*H01S 3/00* (2006.01)

(52) U.S. Cl. ............ 385/125; 385/43; 385/28; 385/122; 385/123; 359/341.1; 372/6

(58) Field of Classification Search ........ 385/122, 385/123, 124, 125, 126, 127, 128, 141, 142, 385/144, 43, 42, 48, 28; 372/6; 359/341.1, 359/333, 342, 345
See application file for complete search history.

(56) References Cited

U.S. PATENT DOCUMENTS

| | | | |
|---|---|---|---|
| 5,864,644 A | 1/1999 | DiGiovanni et al. | 385/43 |
| 5,907,652 A | 5/1999 | DiGiovanni et al. | 385/125 |
| 5,935,288 A | 8/1999 | DiGiovanni et al. | 65/408 |
| 6,112,555 A | 9/2000 | Bloom | 67/378 |
| 6,362,916 B2* | 3/2002 | Wu et al. | 359/337.1 |
| 6,631,234 B1 | 10/2003 | Russell et al. | 385/125 |
| 6,778,562 B2 | 8/2004 | Bayart et al. | 372/6 |
| 6,987,783 B2* | 1/2006 | Fajardo et al. | 372/6 |
| 2001/0022879 A1* | 9/2001 | Wu | 385/28 |
| 2002/0114574 A1* | 8/2002 | Chandalia et al. | 385/48 |
| 2004/0202438 A1* | 10/2004 | Eggleton et al. | 385/125 |
| 2006/0067632 A1* | 3/2006 | Broeng et al. | 385/96 |

FOREIGN PATENT DOCUMENTS

| | | |
|---|---|---|
| EP | 1 286 191 A2 | 2/2003 |
| EP | 1 199 582 B1 | 9/2004 |
| GB | 2 386 435 A | 9/2003 |
| WO | WO 99/00685 A1 | 1/1999 |
| WO | WO 01/06020 A2 | 12/2001 |
| WO | WO 02/084350 A1 | 10/2002 |
| WO | WO 03/019257 A1 | 3/2003 |
| WO | WO 03-032039 A1 | 4/2003 |
| WO | WO 03/038486 A2 | 5/2003 |
| WO | WO 03/078338 A2 | 9/2003 |
| WO | WO 03/079077 A1 | 9/2003 |
| WO | WO 2005/091029 A2 | 9/2005 |

OTHER PUBLICATIONS

Bjarklev, Broeng, and Bjarkley in "Photonic crystal fibres", Kluwer Academic Press, 2003, Chapter 4, pp. 115-130.
Broeng et al, Optical Fibre Technology, vol. 5, pp. 305-330, 1999.

* cited by examiner

*Primary Examiner*—Brian M Healy

(74) *Attorney, Agent, or Firm*—Buchanan Ingersoll & Rooney

(57) ABSTRACT

The present invention relates in general to coupling of light from one or more input waveguides to an output waveguide or output section of a waveguide having other physical dimensions and/or optical properties than the input waveguide or waveguides. The invention relates to an optical component in the form of a photonic crystal fiber for coupling light from one component/system with a given numerical aperture to another component/system with another numerical aperture. The invention further relates to methods of producing the optical component, and articles comprising the optical component, and to the use of the optical component. The invention further relates to an optical component comprising a bundle of input fibers that are tapered and fused together to form an input coupler e.g. for coupling light from several light sources into a single waveguide. The invention still further relates to the control of the spatial extension of a guided mode (e.g. a mode-field diameter) of an optical beam in an optical fiber. The invention relates to a tapered longitudinally extending optical waveguide having a relatively larger cross section that over a certain longitudinal distance is tapered down to a relatively smaller cross section wherein the spatial extent of the guided mode is substantially constant or expanding from the relatively larger to the relatively smaller waveguide cross section. The invention may e.g. be useful in applications such as fiber lasers or amplifiers, where light must be coupled efficiently from pump sources to a double clad fiber.

39 Claims, 23 Drawing Sheets

OPTICAL COUPLER DEVICES, METHODS OF THEIR PRODUCTION AND USE

TECHNICAL FIELD

The present invention relates in general to coupling of light from one or more input waveguides to an output waveguide or output section of a waveguide having other physical dimensions and/or optical properties than the input waveguide or waveguides.

The present invention relates to an optical component in the form of a photonic crystal fibre for coupling light from one component/system with a given numerical aperture to another component/system with another numerical aperture. The invention further relates to methods of producing the optical component, and articles comprising the optical component, and to the use of the optical component. The present invention is based on properties of photonic crystal fibres (PCF).

The present invention further relates to an optical component comprising a bundle of input fibres that are tapered and fused together to form an input coupler e.g. for coupling light from several light sources into a single waveguide.

The present invention still further relates to the control of a change of the spatial extension of a guided mode (e.g. a mode-field diameter) of an optical beam in an optical waveguide, such as an optical fibre. The invention relates to a tapered longitudinally extending optical waveguide having a relatively larger cross-section that over a certain longitudinal distance is tapered down to a relatively smaller cross section wherein the spatial extent of the guided mode is substantially constant or expanding from the relatively larger to the relatively smaller waveguide cross section.

The invention may e.g. be useful in applications such as fibre lasers or amplifiers, where light may be coupled efficiently from pump sources to a double clad fibre using the optical component.

BACKGROUND ART

Optical fibres are today used in numerous applications that span very diverse fields of optics. These fields include telecommunications, medicine, sensors, lasers, and many others. Photonic crystal fibres (PCFs) have recently emerged as an attractive class of fibres, where various properties may be tailored in new or improved manners compared to conventional (solid, non-micro-structured) optical fibers. PCFs are generally described by Bjarklev, Broeng, and Bjarklev in "Photonic crystal fibres", Kluwer Academic Press, 2003.

An NA Converting Optical Waveguide Coupler

A common problem in fibre optics is to launch light into a fibre efficiently. Often the source of light and the fibre to couple into have different divergence angles (numerical aperture (NA)) and spot/core sizes. A specific problem is to launch light from a pump-diode-laser with a large spot size and relatively low numerical aperture into a double clad fibre laser with a small area and large numerical aperture.

The traditional method of solving this problem is to use bulk optics. This solution has a number of problems. One problem is related to difficulties in achieving coupling with low loss. Another problem is to achieve good coupling for a wide range of wavelengths. A third problem is mechanical stability. Fabrication of devices using bulk optics is also relatively complicated. Furthermore, reflection from the multiple glass surfaces may degrade performance of the system.

WO-2003/019257 deals with optical waveguides, for which improved coupling into cladding pumped optical fibres may be obtained through optimal designs of micro-structured outer cladding regions that provide high NA for mode(s) of an inner cladding region. This is achieved by the use of low index cladding features with a relatively narrow area between neighbouring low-index features constituting an air-clad surrounding the inner cladding.

An Optical Coupler Comprising a Bundle of Input Waveguides

About 10 years ago, a new family of optical fibres has appeared, called double cladding fibres. They consist of two waveguides imbedded into each other; an inner and an outer guiding region. Typically, the inner guiding region is a single mode core, whereas the outer region typically is a multi mode core, also called inner cladding.

Microstructured optical fibres, also known as Photonic Crystal Fibres (in the following called PCFs), holey fibres, hole-assisted fibres and by other terms, is a relatively new class of fibres where the guiding mechanism is provided by introducing air holes into the fibre. These holes typically run parallel with the fibre and extend all the way along the fibre length. The guiding principle can either be based on Total Internal Reflection (TIR) such as in traditional optical fibres, or the Photonic Bandgap (PBG) principle. For TIR-based fibres the waveguide (core) typically consists of solid glass having a larger refractive index than the effective refractive index of the surrounding cladding material, which includes a number of closely spaced holes.

In recent years, PCFs have been developed to also show double cladding features. Here, a ring of closely spaced air holes (air-clad) 13 will define the multi mode inner cladding (see FIG. 11). Fibres with air-clad and their fabrication are described in U.S. Pat. No. 5,907,652 and WO03019257 that are incorporated herein by reference. The Numerical Aperture (NA) is mainly given by the distance between these holes and can take values from below 0.2 all the way up to more than 0.8, although typical values lies around 0.6. The core at the centre is typically designed for single-mode operation although multi-mode is also used. In a PCF with a microstructured inner cladding 112, typically holes 111 are placed to lower the effective refractive index. The core 10 may be formed by leaving one or more holes near the centre (see FIG. 11). Alternatively, the core 220 can simply be defined by using a solid material 221 with a higher refractive index than the rest of the inner cladding. Again an air-clad is formed by a ring of holes 222 (see FIG. 12).

A typical use for double cladding fibres is to efficiently convert low quality, low brightness light from e.g. semiconductor lasers to high quality, high brightness light. Brightness is defined as optical power per solid angle per area. For multi mode fibres, conservation of brightness means that the NA multiplied with the waveguide diameter is a constant before and after the coupling/conversion.

The brightness conversion is done by doping the core with a rare earth dopant and pumping this with the multi mode light. The rare earth atoms will absorb the pump light and re-emit the energy at lower photon energies. Since the emission will happen through stimulated emission, this light will be guided in the mode core. Typically single mode operation is preferred, but multi-mode operation is also relevant.

This conversion method can be very efficient (up to around 80%) and the brightness can be improved by more than a factor of 100. Such light sources are often used as popular alternatives to high brightness solid state laser, since they are less bulky and far more efficient.

The limiting factor for the traditional fibres is the refractive index of the cladding material covering the inner cladding/ pump guide. A low refractive index will result in a high NA of the pump guide. This, in turn, will allow either a smaller inner cladding diameter or the coupling of higher optical powers into the guide. Smaller inner cladding diameter means that the pump intensity is increased, which will allow higher efficiency and shorter laser cavities. The current state of the art for non-PCFs is to use a Fluorine-containing polymer cladding with a low refractive index. This will result in an NA of about 0.45. The problem with this is that such a polymer cladding often has problems tolerating the high optical powers, and will burn or degrade over time.

The PCFs, on the other hand, can achieve very high NAs and may be fabricated using only glass-based materials. This means that the inner cladding diameter can be reduced and that the thermal problems are alleviated. Also, there are further advantages, which will be outlined in the following.

When coupling light into a double-cladding PCF, there are a few considerations to make. To make full use of the high NA of the PCFs, one can use free space optics, such as lenses to couple the pump light into the inner cladding. An example can be seen in FIG. 13, where pump light from a single source, for example a fibre 30 delivering a pump light, is to be coupled into a single end of a PCF 31. The first (slow) lens 32 collimates the light 33 from the pump fibre, whereas the second (fast) lens 34 focuses the light into the inner cladding. This approach has the disadvantage that only one pump fibre can be used. Also, such a solution typically has only a coupling efficiency of 80-90%, has high reflections, is sensitive to mechanical drift and instability and sensitive to contamination. Finally, such solution makes packaging design for a commercial device complicated and expensive.

All-fibre pump multiplexers have been developed by several companies, such as ITF, OFS and Nufern. In such couplers, several pump fibres 40 are bundled together and heated to temperatures near melting and tapered 41 (see FIG. 14). Using a slow enough taper, the light from each pump fibre will merge and the down-taper of the diameter will slowly (adiabatically) increase the NA up to 0.45 or even higher.

The problem with these traditional fibre couplers is that the high NA (higher than 0.3) at the output presents a challenge which until now have not been solved. The object of the invention is thus to provide a fiber coupler for coupling two or more light sources which is improved with respect to the prior art fiber couplers, and in particular a fiber coupler which is improved with respect to low loss.

A Mode Field Converting Optical Fibre

Tapered optical fibres are used in a wide variety of optical applications including couplers and mode converters.

A tapered micro-structured fibre system is disclosed in US-2002/0114574. The micro-structured fibre has a core region, a cladding region and one or more axially oriented elements (e.g. capillary air holes) in the cladding region. In an embodiment, the axially oriented elements are partially or fully collapsed during heating and stretching, leaving a silica cladding in its place and thereby providing a mode expansion. This has the disadvantage of not providing a controllably confined mode field.

U.S. Pat. No. 6,778,562 deals with a coupler for a multi-mode pump comprising a photonic crystal fibre with a stretched portion and at least one multimode fibre coupled thereto. A disadvantage of this coupler is that the mode field diameter is smaller at the relatively smaller cross sectional end (the down-tapered end) of the tapered fibre than at the relatively larger cross-sectional end (the un-tapered end).

Double-clad fibres, e.g. optical fibres with an active core for amplifying an optical signal, an inner cladding for guiding multi-mode pump light and an outer cladding, are known. Such fibres receive a large interest due to their potential as high power amplifiers and lasers, see e.g. U.S. Pat. No. 5,907, 652 or WO-03/019257. While these fibres have attractive properties, several practical difficulties exist. For example, many of the unique properties are related to fibres with large cores, so-called large-mode area fibres, including providing tapered fibre bundles with signal feed-through having large mode area at the reduced-diameter end. Simultaneously coupling of pump and signal light to such fibres is a problem. A common approach is to attach a tapered fibre bundle including a single mode fibre onto the double-clad fibre, such as disclosed in U.S. Pat. No. 5,864,644 or in U.S. Pat. No. 5,935,288. However, it is in practice difficult to accurately control the mode field diameter of the single mode core at the tapered end. In particular, it becomes increasingly difficult to control the mode field diameter, as it is increased compared to the un-tapered end, as the mode field diameter is highly sensitive with respect to the core size for these prior art optical fibres. As the MFD is expanded, it expands much faster than the simple scaling of the dimensions of the optical fibre. Further, a large variation in MFD is observed when the core size is reduced. In other words, great care is needed during tapering of the fibre to ensure correct dimensions. Therefore there is a need for improved tapered, optical fibres, specifically tapered fibres providing a smaller variation or more controllable expansion of MFD in the down-tapered end, thereby relaxing the tolerances of the dimensions of the resulting tapered fibre.

DISCLOSURE OF INVENTION

1. A Mode Field Converting Optical Fibre

The problem of the prior art is to provide a sufficiently precise control of the mode field diameter in a tapered waveguide.

The object of the present invention is to provide an improved optical fibre wherein the radial extension of a guided mode (e.g. a mode field diameter) can be flexibly controlled to provide an optical fibre that is suitable for use as an input or output coupler.

The objects of the invention are achieved by the invention described in the accompanying claims and as described in the following.

An object of the invention is achieved by a tapered optical fibre with a thick end and a reduced-diameter end, said tapered optical fibre comprising an inner core, an outer core and an outer cladding, said inner core, outer core and outer cladding being designed in a suitable manner to provide a first mode field diameter, $MFD_1$, at the reduced-diameter end and a second mode field diameter, $MFD_2$, at the thick end, where $MFD_2$ is substantially equal to or larger than $MFD_1$, such that light that is confined by the inner core with $MFD_1$ at the thick end is redistributed as it propagates through said tapered optical fibre and becomes confined by the outer core at the reduced-diameter end with $MFD_2$.

In an aspect of the invention, an optical fibre having a longitudinal, optical axis, and a cross section perpendicular to the longitudinal axis is provided, the optical fibre being adapted to guide light at an operating wavelength λ, the optical fibre comprising:

a. a first core region disposed around the longitudinal, optical axis, the first core region exhibiting a predetermined refractive index profile $n_{core-1}$;

b. a surrounding region surrounding the first core region, the surrounding region comprising a cladding region comprising a cladding material having a refractive index $n_{clad}$, the surrounding region having a predetermined effective refractive index $n_{eff,sr}$;

c. a first fibre cross section having a relatively larger area;

d. a second fibre cross section having a relatively smaller area;

e. the first and second fibre cross sections being separated by a tapered length of the optical fibre over which the cross-sectional physical dimensions of the fibre are tapered down from the first to the second cross section; and wherein the first and second cross sectional areas, the refractive index profile $n_{core-1}$ of the core region, and the effective refractive index $n_{eff,sr}$ of the surrounding region are adapted—at the operating wavelength—to provide a mode field of a guided mode of the optical fibre with a diameter $MFD_1$ in the first cross section, and a mode field with a diameter $MFD_2$ in the second cross section, and wherein $MFD_2$ is larger than or equal to $MFD_1$.

In the present context, the 'core region' is defined—when viewed in a cross section perpendicular to a longitudinal direction of the fibre—as a (typically central) light-propagating part of the fibre.

The term 'micro-structural elements' is in the present context taken to mean structural elements enclosed by a background material, the micro-structural elements having a different refractive index than said background material. A micro-structural element may e.g. be a hole or void or any other element enclosed in a background material and having a refractive index different from that of the background material, e.g. of a fluid or solid material.

The refractive index $n_x$ is generally the conventional refractive index of a homogeneous material. The effective refractive index $n_{eff,x}$ is the index that light at a given wavelength, $\lambda$, experiences when propagating through a given material that may be inhomogeneous (meaning that the material complex e.g. comprises two or more sub-materials, typically a background material of one refractive index and one or more types of features (typically termed micro-structural elements in the present application) of different refractive index/indices). For homogeneous materials, the refractive and the effective refractive index will naturally be similar.

For photonic crystal fibres according to the present invention, the most important optical wavelengths are in the ultraviolet to infrared regime (e.g. wavelengths from approximately 150 nm to 11 µm). In this wavelength range the refractive index of most relevant materials for fibre production (e.g. silica) may be considered mainly wavelength independent, or at least not strongly wavelength dependent. However, for non-homogeneous materials, such as fibres comprising micro-structural elements, e.g. voids or air holes, the effective refractive index may be very dependent on the morphology of the material. Furthermore, the effective refractive index of such a fibre may be strongly wavelength dependent. The procedure of determining the effective refractive index at a given wavelength of a given fibre structure having voids or holes is well-known to those skilled in the art (see e.g. Broeng et al, Optical Fibre Technology, Vol. 5, pp. 305-330, 1999).

An object of the invention is achieved by An optical fibre having a longitudinal, optical axis, and a cross section perpendicular to the longitudinal axis, the optical fibre being adapted to guide light at an operating wavelength $\lambda$, the optical fibre comprising:

a. a first core region disposed around the longitudinal, optical axis, the first core region exhibiting a predetermined refractive index profile $n_{core-1}$;

b. a second core region surrounding the first core region, the second core region exhibiting a predetermined refractive index profile $n_{core-2}$;

c. a cladding region surrounding the second core region and comprising a multitude of longitudinally extending spaced apart micro-structural holes disposed in a cladding material, the cladding material having a refractive index $n_{clad}$, the holes having cross sectional dimensions $d_i(z)$ and mutual centre to centre distances $\Lambda_{ij}(z)$, z being a spatial coordinate along the longitudinal axis of the optical fibre;

d. a first fibre cross section at coordinate $z_1$ having a relatively larger area;

e. a second fibre cross section at coordinate $z_2$ having a relatively smaller area;

f. the first and second fibre cross sections being separated by a tapered length of the optical fibre over which the cross-sectional physical dimensions of the fibre—including the micro-structural holes—are tapered down from the first to the second cross section; and wherein the first and second cross sectional areas, the refractive index profiles $n_{core-1}$, $n_{core-2}$ of the first and second core regions, the refractive index $n_{clad}$ of the cladding region and the cross sectional dimensions $d_j$ and mutual centre to centre distances $\Lambda_{ij}$ of the micro-structural holes in the first and second cross sectional areas are adapted—at the operating wavelength—to provide a mode field of a guided mode of the optical fibre with a diameter $MFD_1$ in the first cross section, and a mode field with a diameter $MFD_2$ in the second cross section, and wherein $MFD_2$ is larger than or equal to $MFD_1$.

This has the advantage of providing a flexible scheme for controlling the spatial extension of the mode field of a guided mode of a tapered optical fibre, whereby light coupled to the first core region of the tapered optical fibre at a first relatively larger cross section has a mode field diameter $MFD_1$ substantially determined by the cross-sectional extension of core region 1 and at a second relatively smaller cross section has a mode field diameter $MFD_2$ substantially determined by the cross-sectional extension of core region 2.

The cross-sectional extension of core region 2 is determined by the innermost holes of the cladding region.

In a particular embodiment, the cross sectional dimensions $d_i$ (i=1, 2, . . . , N) of the holes are substantially equal (i.e. within processing tolerances). In a particular embodiment, the holes are substantially circular, d being an inner diameter of a hole in the cross section in question ($z=z_1$).

In a particular embodiment, the micro-structural holes are arranged in a substantially periodic pattern when viewed in a cross section of the optical fibre perpendicular to the longitudinal axis, the periodicity being defined by the location of the centres of the micro-structural elements. In a particular embodiment, the nearest neighbour mutual centre to centre distances $\Lambda_{ij}$, (i, j=1, 2, . . . , N)—termed the pitch—is substantially equal within processing tolerances.

In a particular embodiment, an optical fibre having a mode field with a diameter MFD which is substantially constant over the tapered length of the fibre from the first cross section to the second cross section of the optical fibre is provided.

In a particular embodiment, in the second fibre cross section, the cross sectional dimensions of at least the innermost holes of the cladding region are larger than zero, such that they substantially determine the confinement of the guided mode. The cross sectional dimensions being larger than zero is taken to mean that the holes are un-collapsed in the second relatively smaller cross section, so that the holes contribute to the confinement of a guided mode of the optical fibre at the operating wavelength.

In a particular embodiment, at least the innermost holes have substantially similar ratio of cross sectional dimension to mutual centre to centre distance $d/\Lambda$ at the first and second cross sections. In an embodiment the holes are substantially linearly down-scaled.

An object of the invention is achieved by an optical fibre having a longitudinal, optical axis, and a cross section perpendicular to the longitudinal axis, the optical fibre being adapted to guide light at an operating wavelength $\lambda$, the optical fibre comprising:
  a. a first core region disposed around the longitudinal, optical axis, the first core region exhibiting a predetermined refractive index profile $n_{core-1}$;
  b. a second core region surrounding the first core region, the second core region exhibiting a predetermined refractive index profile nc;.
  c. a cladding region surrounding the second core region, the cladding region having a refractive index $n_{clad}$;
  d. a first fibre cross section having a relatively larger area;
  e. a second fibre cross section having a relatively smaller area;
  f. the first and second fibre cross sections being separated by a tapered length of the optical fibre over which the cross-sectional physical dimensions of the are tapered down from the first to the second cross section; and wherein the first and second cross sectional areas, the refractive index profiles of the first and second core regions and the refractive index $n_{clad}$ of the cladding region are adapted—at the operating wavelength—to provide a mode field of a guided mode of the optical fibre with a diameter $MFD_1$ in the first cross section, and a mode field with a diameter $MFD_2$ in the second cross section, and wherein $MFD_2$ is larger than or equal to $MFD_1$.

This has the advantage of providing an alternative solution in the form of an all solid optical fibre (i.e. not necessarily comprising micro-structural features).

In a particular embodiment, the optical fibre further comprises an intermediate region surrounding the first core region and being surrounded by the second core region.

In a particular embodiment, the intermediate region is disposed adjacent to the first and second core regions.

In a particular embodiment, the intermediate region exhibits a predetermined refractive index profile $n_{ir}$ and wherein $n_{ir} < n_{core-1}$ and $n_{ir} < $ ncl .

In a particular embodiment, the geometrically averaged refractive index $n_{g,core-1,ir}$ of the first core and intermediate regions are substantially equal to the refractive index $n_{core-2}$ of the second core region. Thereby an optical fibre having a mode field with a diameter $MFD_1$ disposed in said first core region for said first cross section, and a mode field with a diameter $MFD_2$ disposed in said second core region for said second cross section, and wherein $MFD_2$ is larger than $MFD_1$ can be provided.

In a particular embodiment, the absolute value of the difference between $n_{g,core-1,ir}$ and $n_{core-2}$ is smaller than $5 \cdot 10^{-3}$, such as smaller than $1 \cdot 10^{-3}$, such as smaller than $0.8 \cdot 10^{-3}$, such as smaller than $0.5 \cdot 10^{-3}$, such as smaller than $0.3 \cdot 10^{-3}$, such as smaller than $0.1 \cdot 10^{-3}$.

In a particular embodiment, the refractive index profile of the first core region is a step-index-profile with an index-step $\Delta n_1$ down to the refractive index $n_{core-2}$ of the second core region. In a particular embodiment, $\Delta n_1$ is larger than $1 \cdot 10^{-3}$, such as larger than $5 \cdot 10^{-3}$, such as larger than $6 \cdot 10^{-3}$, such as larger than $10 \cdot 10^{-3}$.

In a particular embodiment, the refractive index profile of the first core region is a step-index-profile with an index-step $\Delta n_{1-clad}$ down to the refractive index of the cladding material $n_{clad}$. In a particular embodiment, $\Delta n_{1-clad}$ is larger than $1 \cdot 10^{-3}$, such as larger than $5 \cdot 10^{-3}$, such as larger than $6 \cdot 10^{-3}$, such as larger than $10 \cdot 10^{-3}$.

In a particular embodiment, $\Delta n_1$ is identical to $\Delta n_{1-clad}$.

In a particular embodiment, the refractive index profile of the intermediate region is a step-index-profile with an index-step $\Delta n_2$ up to the refractive index $n_{core-2}$ of the second core region. In a particular embodiment, $\Delta n_2$ is larger than $0.1 \cdot 10^{-3}$, such as larger than $0.5 \cdot 10^{-3}$, such as larger than $1 \cdot 10^{-3}$, such as larger than $5 \cdot 10^{-3}$, such as larger than $10 \cdot 10^{-3}$.

In a particular embodiment, the refractive index profile of the intermediate region is a step-index-profile with an index-step $\Delta n_{2-clad}$ up to the refractive index of the cladding material $n_{clad}$. In a particular embodiment, $\Delta n_{2-clad}$ is larger than $0.1 \cdot 10^{-3}$, such as larger than $0.5 \cdot 10^{-3}$, such as larger than $1 \cdot 10^{-3}$, such as larger than $5 \cdot 10^{-3}$, such as larger than $10 \cdot 10^{-3}$.

In a particular embodiment, the refractive index profile of the second core region is a step-index-profile with an index-step $\Delta n_3$ down to the refractive index of the surrounding cladding region. In a particular embodiment, $\Delta n_3$ is smaller than $5 \cdot 10^{-3}$, such as smaller than $3 \cdot 10^{-3}$, such as smaller than $1 \cdot 10^{-3}$, such as smaller than $0.8 \cdot 10^{-3}$, such as smaller than $0.5 \cdot 10^{-3}$, such as smaller than $0.3 \cdot 10^{-3}$.

In a particular embodiment, $\Delta n_1$ is in the range from $1 \cdot 10^{-3}$ to $2 \cdot 10^{-2}$, and $\Delta n_2$ is in the range from $0.1 \cdot 10^{-3}$ to $2 \cdot 10^{-2}$, and $\Delta n_3$ is in the range from $0.1 \cdot 10^{-3}$ to $1 \cdot 10^{-2}$.

In a particular embodiment, the first core region has a $NA_{core-1}$ and dimension, $d_{2,core-1}$ in said second fibre cross section, and wherein $2\pi/\lambda * d_{2,core-1}/2 * NA_{core-1}$ is less than 2.

In a particular embodiment, the first core region has a $NA_{core-1}$ and dimension, $d_{1,core-1}$ in said first fibre cross section, and wherein $2\pi/\lambda * d_{1,core-1}/2 * NA_{core-1}$ is less than 4.

In a particular embodiment,
  a. the first core region has a numerical aperture $NA_{core-1}$ and a cross-sectional dimension $d_{1,core-1}$ in said first fibre cross section, and a cross-sectional dimension $d_{2,core-1}$ in said second fibre cross section;
  b. the second core region has a refractive index $n_{core-2}$, a numerical aperture $NA_{core-2}$ in said second fibre cross section, a cross-sectional dimension $d_{1,core-2}$ in said first cross section, and a cross-sectional dimension $d_{2,core-2}$ in said second fibre cross section;
  c. an outer cladding region surrounding said second core region, said outer cladding region having a refractive index $n_{1,clad}$ or effective refractive index $n_{1,eff,clad}$ in said first fibre cross section and $n_{2,clad}$ or $n_{2,eff,clad}$ in said second fibre cross section;
  d. $n_{core-1} > n_{core-2}$;
  e. $n_{1,clad} < n_{core-2} < 1.002 * n_{1,clad}$; or $n_{1,eff,clad} < n_{core-2} < 1.002 * n_{1,eff,clad}$;
  f. $d_{1,core-1} > 1.3 * d_{2,core-1}$
  g. $d_{2,core-2}$ is larger than or equal to $d_{1,core-1}$;
  h. $2\pi/\lambda * d_{1,core-1}/2 * NA_{core-1}$ is less than 4;
  i. $2\pi/\lambda * d_{2,core-1}/2 * NA_{core-1}$ is less than 2;
  j. $2\pi/\lambda * d_{2,core-2}/2 * NA_{core-2}$ is less than 4.

In a particular embodiment, $MFD_2 \geq 1.1 * MFD_1$, such as $MFD_2 \geq 1.2 * MFD_1$, such as $MFD_2 \geq 1.3 * MFD_1$, such as $MFD_2 \geq 1.4 * MFD_1$, such as $MFD_2 \geq 1.5 * MFD_1$, such as $MFD_2 \geq 1.8 * MFD_1$, such as $MFD_2 \geq 2.0 * MFD_1$, such as $MFD_2 \geq 2.5 * MFD_1$, such as $MFD_2 \geq 3.0 * MFD_1$.

In a particular embodiment, $d_{1,core-1} > 1.5 * d_{2,core-1}$, such as $d_{1,core-1} > 1.8 * d_{2,core-1}$, such as $d_{1,core-1} > 2.0 * d_{2,core-1}$, such as $d_{1,core-1} > 2.5 * d_{2,core-1}$, such as $d_{1,core-1} > 3.0 * d_{2,core-1}$, such as $d_{1,core-1} > 3.5 * d_{2,core-1}$, such as $d_{1,core-1} > 4.0 * d_{2,core-1}$.

In a particular embodiment, $d_{2,core-2} \geq 1.2 * d_{1,core-1}$, such as $d_{2,core-2} \geq 1.3 * d_{1,core-1}$, such as $d_{2,core-2} \geq 1.4 d_{1,core-1}$, such as $d_{2,core-2} \geq 1.5 * d_{1,core-1}$, such as $d_{2,core-2} \geq 1.8 * d_{1,core-1}$, such as $d_{2,core-2} \geq 2.0 * d_{1,core-1}$, such as $d_{2,core-2} \geq 2.5 * d_{1,core-1}$, such as $d_{2,core-2} \geq 3.0 * d_{1,core-1}$.

In a particular embodiment, $2\pi/\lambda * d_{1,core-1}/2 * NA_{core-1} \leq 3.5$, such as $2\pi/\lambda * d_{1,core-1}/2 * NA_{core-1} \leq 3.0$, such as $2\pi/\lambda * d_{1,core-1}/2 * NA_{core-1} \leq 2.5$.

In a particular embodiment, $2\pi/\lambda * d_{1,core-1}/2 * NA_{core-1} \leq 2.4$, such as $2\pi/\lambda * d_{1,core-1}/2 * NA_{core-1} \leq 2.2$.

In a particular embodiment, $2\pi/\lambda * d_{2,core-1}/2 * NA_{core-1} \leq 1.8$, such as $2\pi/\lambda * d_{2,core-1}/2 * NA_{core-1} \leq 1.6$, such as $2\pi/\lambda * d_{2,core-1}/2 * NA_{core-1} \leq 1.4$, such as $2\pi/\lambda * d_{2,core-1}/2 * NA_{core-1} \leq 1.2$, such as $2\pi/\lambda * d_{2,core-1}/2 * NA_{core-1} \leq 1.0$, such as $2\pi/\lambda * d_{2,core-1}/2 * NA_{core-1} \leq 0.8$.

In a particular embodiment, $2\pi/\lambda * d_{2,core-2}/2 * NA_{core-2} \leq 3.5$, such as $2\pi/\lambda * d_{2,core-2}/2 * NA_{core-2} \leq 3.0$, such as $2\pi/\lambda * d_{2,core-2}/2 * NA_{core-2} \leq 2.5$.

In a particular embodiment, $2\pi/\lambda * d_{2,core-2}/2 * NA_{core-2} \leq 2.4$, such as $2\pi/\lambda * d_{2,core-2}/2 * NA_{core-2} \leq 2.2$.

In a particular embodiment, the tapered optical fibre has a mode field that varies less than 20% in its radial extension along said longitudinal, optical axis from said first to said second cross section.

An optical fibre for guiding light at a predetermined wavelength, $\lambda$, and having a longitudinal, optical axis is further provided, comprising:

a. a first core region disposed around said longitudinal, optical axis having a refractive index $n_{core-1}$, a numerical aperture $NA_{core-1}$, dimension $d_{1,core-1}$;

b. a second core region surrounding said first core region, said second core region having a refractive index $n_{core-2}$, dimension $d_{1,core-2}$;

c. an outer cladding surrounding said second core region, said outer cladding having a refractive index $n_{1,clad}$ or effective refractive index $n_{1,eff,clad}$;

d. $n_{core-1} > n_{core-2}$;

e. $2\pi/\lambda * d_{1,core-1}/2 * NA_{core-1}$ in the range from 1.5 to 4;

f. $2\pi/\lambda * d_{1,core-2}/2 * NA_{core-2}$ in the range from 2.0 to 28.

A method of producing a tapered optical fibre is further provided, the method comprising the steps of:

a. heating a section of an optical fibre as described above;

b. stretching the optical fibre during heating; thereby providing first and second fibre cross sections being separated by a tapered length of the optical fibre over which the cross-sectional physical dimensions of the fibre are tapered down from the first to the second cross section; and c. optionally cleaving the optical fibre after stretching at one or more positions.

In a particular embodiment, the tapered optical fibre is stretched and optionally cleaved to provide a second cross section in which the inner core has a dimension $d_{2,core-1}$, and wherein $2\pi/\lambda * d_{2,core-1}/2 * NA_{core-1}$ is less than 2.

In a particular embodiment, the tapered optical fibre is stretched and optionally cleaved to provide:

a. said first core region having a dimension $d_{2,core-1}$ in said second cross section;

b. said second core region having a numerical aperture $NA_{core-1}$ and dimension $d_{2,outer}$ in said second cross section;

c. said outer cladding surrounding said second core region and having a refractive index $n_{2,clad}$ or effective refractive index $n_{2,eff,clad}$ in said second cross section; and d. wherein e. $d_{1,core-1} > 1.3\, d_{2,core-1}$;

f. $d_{2,core-2}$ is larger than or equal to $d_{1,core-1}$;

g. $2\pi/\lambda * d_{2,core-1}/2 * NA_{core-1}$ is less than 2;

h. $2\pi/\lambda * d_{2,core-2}/2 * NA_{core-2}$ in the range from 1.5 to 4.

In a particular embodiment, the stretching is performed using a fibre tapering rig after production of an optical fibre as described above.

In a particular embodiment, the stretching is performed during production of a fused, tapered fibre bundle comprising an optical fibre as described above.

A method of producing a tapered optical fibre is furthermore provided, the method comprising the steps of:

a. providing a preform comprising cross-sectional characteristics of an optical fibre as described above on a larger scale;

b. placing said preform in an optical fibre drawing tower setup;

c. pulling optical fiber from a heated end of said preform;

d. varying fibre pulling speed and/or preform feed speed during fibre pulling.

A method for combining a first optical device having a light guiding structure with a mode field with diameter $MFD_f$ and a second optical device having a light guiding structure with a mode field with diameter $MFD_s$ different from $MFD_f$ is furthermore provided, the method comprising:

a. providing an optical fibre as described herein or a tapered optical fibre realized using a method as described herein having a thick end with $MFD_1$ substantially similar to $MFD_f$ and a reduced-diameter end with $MFD_2$ substantially similar to $MFD_s$;

b. attaching said thick end to said first optical device;

c. attaching said reduced-diameter end to said second optical device.

An Article Comprising a Tapered Optical Fibre

An article comprising a photonic crystal fibre according to an aspect of the invention and as described in section '1. A mode field converting optical waveguide fibre' and in the corresponding claims is moreover provided by the present invention, whereby improved devices performing specific functions such as lasers or amplifiers can be provided.

In a particular embodiment, the article is an input or output coupler.

In an embodiment of the invention, the article is a fibre amplifier.

In an embodiment of the invention, article is a fibre laser.

Use of a Tapered Optical Fibre

Use of an optical fibre according to an aspect of the invention and as described in section '1. A mode field converting optical waveguide fibre' and in the corresponding claims is moreover provided by the present invention, whereby specific functional features can be achieved in a relatively simple and economic way.

In embodiments of the invention, use is made of the optical fibre as an input/output coupler.

2. An NA Converting Photonic Crystal Fibre

It is an object of the present invention to provide improved optical components and methods for coupling light into optical fibres.

It is an object of the present invention to provide an optical component that may transform light from one NA and/or core/spot size to another NA and/or core/spot size.

The numerical aperture (NA) is given by the divergence angle. For standard fibre, NA is given by the refractive index difference between the core and the cladding. For air-clad fibres, the NA is given by the core index and the specific geometry and material choice of the air-clad (as described in WO03019257). The larger the NA, the larger angle of incident light is guided by total internal reflection. Typically, NA of a waveguide is defined by: $NA=\sin(\theta)$, where $\theta$ is given as the FWHM or $1/e^2$ angle of the a light beam emitted from the waveguide.

This and other objects of the invention are achieved by the invention described in the accompanying claims and as described in the following.

An object of the invention is achieved by a photonic crystal fibre comprising a) a multi-mode core region for propagating light in a longitudinal direction of said photonic crystal fibre, b) an air-clad region comprising a multitude of longitudinally extending spaced apart micro-structural elements surrounding said multi-mode core region, the photonic crystal fibre comprising a first and a second end, wherein cross-sectional dimensions of said multimode core region and said air-clad region are reduced from said first end to said second end so that brightness is essentially conserved.

Brightness is defined as luminous flux emitted from a surface per unit solid angle per unit of area, projected onto a plane normal to the direction of propagation. In other words, the term brightness is in the present context taken to mean $B=P/(\Omega*A)$, where P is optical power, $\Omega$ is solid angle and A is area of emitted light from a facet. Brightness is also known as luminance and luminous sterance.

The term 'brightness is essentially conserved' is in the present context taken to mean that the ratio of the brightness at the first and second ends respectively is in the range from 60% to 100%, such as in the range from, 80% to 99%, 90% to 99%.

It is to be understood that in the present context, a 'photonic crystal fibre' may have cross sectional dimensions that are normal for a product to be termed an 'optical fibre', i.e. including outer cross sectional dimensions in the range hundred to several hundred µm range as well as larger dimensions such as in the mm range.

In the present context, the 'multi-mode core region' is defined—when viewed in a cross section perpendicular to a longitudinal direction of the fibre—as a (typically central) light-propagating part of the fibre. The multi-mode core region is limited in a radial direction by micro-structural elements of the air-clad region. The multi-mode core is typically used to guide pump light from one or more pump light sources to a double-clad fibre (standard or air-clad fibres are both of relevance), the double-clad fibre comprising one or more single- or few mode cores that comprise one or more rare earth dopants (active materials). Optionally, a photonic crystal fibre according to a preferred embodiment of the present invention may comprise a single- or few-mode core being surrounded by the multi-mode core. This may for example be preferred in order to combine a pump coupling fibre component and an active, air-clad optical fibre into one device. In current 'double clad fibre terminology' a 'multi-mode core' is sometimes termed an 'inner cladding' or 'a pump core'.

Advantages of having both a single-or few-mode core surrounded by a multi-mode core may also be that an optical device (comprising a PCF according to the invention) for example may be used to couple pump light into the multi-mode core, as well as to couple light from a single-mode seed or feed signal to the single- or few mode core, for example for seeding a short pulse air-clad fibre amplifier.

The term 'micro-structural elements' is in the present context taken to mean structural elements enclosed by a background material, the micro-structural elements having a different refractive index than said background material. A micro-structural element may e.g. be a hole or void or any other element enclosed in a background material having a refractive index different from that of the background material, e.g. of a fluid or solid material.

In an embodiment, the multitude of micro-structural elements constituting the air-clad comprises at least one ring of longitudinally extending micro-structural elements, a ring of micro-structural elements being interpreted as a group of elements located on an annular curve (e.g. a circular or elliptical curve), the elements being located on the curve being understood as each element of the group constituting a ring of elements having their outer boundaries touching or intersecting the annular curve.

In an embodiment of the invention, the micro-structural elements of the air-clad comprise holes or voids. In an embodiment, a majority or all of the micro-structural elements of the air-clad are constituted by holes.

In an embodiment of the invention, the photonic crystal fibre has numerical aperture NA and maximum cross sectional dimension D of the multimode core region (e.g. the diameter of a substantially circular multimode core region) at said first and second ends $NA_1$, $D_1$ and $NA_2$, $D_2$, respectively.

With brightness generally defined as $B=P/(\Omega*A)$, $\Omega*A$ may be determined from $NA*D$. Hence, for a loss-less photonic crystal fibre according to an embodiment of the present invention, brightness conservation from the first end to the second end means $NA_1*D_1=NA_2*D_2$. In practice, loss-free operation is not possible (due to many factors including material absorption, structural variations in raw materials, production-induced structural variations, etc.), and essential brightness conservation may be expressed as $NA_1*D_1/NA_2*D_2$ in the range from 0.5 to 1.5. The ratio may be smaller or larger than 1 depending on the exact structure at two ends of the optical fibre.

In an embodiment, the ratio of the product of the numerical aperture and the maximum cross sectional dimension at said first and second ends, $NA_1*D_1/NA_2*D_2$ is in the range from 0.5 to 1.5 such as from 0.8 to 1.2, such as from 0.9 to 1.1.

In an embodiment of the invention, the cross sectional dimensions of the multimode core region and the air-clad region are smaller at the second end than at the first and whereby it is achieved that the PCF has a larger NA at second ($NA_2$) end than at the first end ($NA_1$), and $D_2$ is smaller than $D_1$. The first end may serve as an input end for coupling light from a pump light source and the second end may be used to couple light to a double-clad fibre—for example an active, double-clad fibre. The second end may alternatively be the end of an active, double-clad fibre being part of the NA converting optical fibre.

In an embodiment, the cross sectional dimensions of the PCF at the first end is larger than or around twice the corresponding dimensions at the second end, such as larger than or around three times, such as larger than or around 4 times, such as larger than or around 5 times the corresponding dimensions at the second end.

In an embodiment of the invention, the minimum boundary to boundary distance between neighbouring micro-structural elements of the air-clad in an annular direction—termed the bridge width—is denoted b. In an embodiment, the micro-structural elements of the air-clad are located on concentric rings and b is substantially constant for all elements of a particular ring. In an embodiment, the ratio of the maximum cross sectional dimension of the multimode core region to the minimum boundary to boundary distance between neighbouring elements of a ring of elements of the air-clad, $D_i/b_i$ is substantially equal at the cross sections of the first and second ends of the PCF. In an embodiment of the invention, the ratio $(D_1/b_1)/(D_2/b_2)$ is in the range from 0.5 to 1.5 such as from 0.7 to 1.2, such as from 0.8 to 1.0, such as from 0.8 to 0.9. In an embodiment, the elements are holes.

As shown in FIG. 30 in WO03019257, NA scales essentially linearly with $\lambda/b$ for large b of the air-clad fibres disclosed therein. For small b, however, ($\lambda/b > 1.5$), a deviation from linearity is seen. To compensate for this and to preserve a substantially linear relationship between the product of numerical aperture and core diameter $NA_i * D_i$ (and essentially conserve of brightness) over a length of the PCF where cross sectional dimensions are changed, the bridge width b may, for example, be controlled by pressure control during production of the PCF (in the case of decreasing cross sectional dimensions from a first (index i=1) end to a second (index i=2) end, and further decrease $b_2$ by increasing pressure in the air holes).

For photonic crystal fibres according to the present invention, the most important optical wavelengths are in the ultraviolet to infrared regime (e.g. wavelengths from approximately 150 nm to 11 μm).

In an embodiment of the invention, said core region is homogeneous and made of a single material with refractive index $n_{core}$.

In a preferred embodiment of the invention, the cross sectional form of the micro-structural elements is essentially circular, essentially circular meaning drawn from a preform where the corresponding structural elements have a circular cross section. However, the cross sectional form of the micro-structural elements may take on any appropriate form such as essentially triangular, quadratic, polygonal, elliptical, etc., as implemented by drawing a fibre from a preform having corresponding structural elements of corresponding form(s), possibly modifying the form by proper control of the pressure of capillary preform elements during fabrication cf. the section "A method of manufacturing an NA converting photonic crystal fibre" below. In an embodiment of the invention, the micro-structural elements are holes or voids.

In an embodiment of the invention, 'essentially equal' in connection with cross sectional fibre dimensions (including those of micro-structural elements) is taken to mean that the fibre is drawn from a preform where the corresponding structural elements (typically canes or tubes of circular cross section) have equal outer maximum cross sectional dimension (typically diameter) or inner maximum cross sectional dimension (typically diameter).

In an embodiment of the invention, the (multimode) core region is essentially circular in a transversal cross section of the fibre, essentially circular meaning drawn from a preform where the corresponding structural element has a circular cross section, e.g. a circular core cane (hollow or solid) surrounded by a number of circular canes constituting a part of the cladding region.

In an embodiment of the invention, a single- or few-mode inner core is present in the multimode core region. In an embodiment, a PCF having a central core region surrounded by an array of air holes implementing a so-called 'endlessly single-mode' core is provided (i.e. a specially designed microstructured region inside at least part of the multi-mode core may form the cladding of an endlessly single mode fibre; see e.g. WO09900685 for details). Such an optical fibre will be single mode both at the first end (having relatively large cross sectional dimensions) AND at the second end (having relatively small cross sectional dimensions), since the holes are just scaled down (so that the fibre retains single mode properties).

In an embodiment of the invention, the PCF is an optically active fibre. In an embodiment, the PCF comprises an active central core region (so that the NA converting fibre and the active fibre are integrated). This has the advantage of eliminating the need for splicing/coupling light from the NA converting fibre to the active fibre thereby proving practically loss less in-coupling to an active fibre with a small inner cladding.

In an embodiment, the multimode core region of the PCF comprises a rare-earth doped region. In an embodiment of the invention, said core region comprises rare earth dopant ions, such as Er, Yb, Nd, Ho, Sm or Tm or combinations thereof.

In an embodiment of the invention, said core region comprises refractive index modifying, photosensitive and/or optically active dopant material(s), whereby gratings may be written in the fibre and/or the fibre may be used for optical amplification/lasing.

In an embodiment, the PCF is adapted for use as an amplifier or laser. In an embodiment, the PCF comprise one or more reflecting elements. In an embodiment, the PCF comprises at least one Bragg grating. In an embodiment, the PCF comprises a Bragg grating in the second section having the relatively smaller cross sectional dimensions.

The advantage is that the coupling optics may be built into the same optical fibre that provides the gain for a laser or an amplifier. Thereby the need for bulky and lossy bulk optics is eliminated. The integration may also be achieved through splicing of separate (passive) NA converting fibre to separate active double-clad fibres. In an embodiment, the active double clad fibre is a non-air-clad double clad fibre, such as a polymer-based double clad fibre.

In a particular embodiment, the photonic crystal fibre further comprises a solid cladding region surrounding said multimode core region, said solid cladding region having a refractive index, $n_{clad-solid}$ smaller than $n_{MMcore}$.

In a particular embodiment, the said air-clad region comprises a background material of refractive index, $n_{clad-solid}$, wherein $n_{clad-solid}$ is smaller than $n_{MMcore}$, whereby the solid cladding region can contribute to the numerical aperture of the fibre.

In a particular embodiment, the $\mathrm{sqrt}(n^2_{MMcore} - n^2_{clad-solid})$ is larger than 0.12, such as larger than 0.15, such as larger than 0.22 ('sqrt' being short for square root), whereby the solid cladding region can contribute to the numerical aperture of the fibre with values larger than 0.12, etc.

In a particular embodiment, the air-clad region in a portion of said first end is collapsed whereby the optical fibre can be provided with a solid end that has an NA larger than 0.12 or 0.15 or 0.22. Such a solid end has the advantage being more practical to work with e.g. for splicing and/or protecting the fibre from contamination of the air holes. The NA for the collapsed fibre end is given by $\mathrm{sqrt}(n^2_{MMcore} - n^2_{clad-solid})$.

In a particular embodiment, the air-clad region in a portion of said first end is collapsed.

In a particular embodiment, the singlemode or few mode core region has a predetermined refractive index profile $n_{core-1}$ and the photonic crystal fibre further comprises a second core region surrounding the singlemode or few mode core region and having a predetermined refractive index profile $n_{core-2}$.

In a particular embodiment, the photonic crystal fibre further comprises a cladding region surrounding the second core region, the cladding region comprising a multitude of longitudinally extending spaced apart micro-structural holes disposed in a cladding material, the cladding material having a refractive index $n_{clad}$, the holes having cross sectional dimensions $d_i(z)$ and mutual centre to centre distances $\Lambda_{ij}(z)$, z being a coordinate along the longitudinal axis of the optical fibre;

the singlemode or few mode core region, the second core region and the cladding region being located within the multi-mode core region, wherein the cross-sectional dimensions, the refractive index profiles $n_{core-1}$ and $n_{core-2}$ of the core regions, the refractive index $n_{clad}$ of the cladding region and the cross sectional dimensions and mutual centre to centre distances of the micro-structural holes at the first and second ends of the optical fibre are adapted to provide a mode field of a guided mode of the optical fibre with a diameter $MFD_1$ at the first end, and a mode field with a diameter $MFD_2$ at the second end, and wherein $MFD_2$ is larger than or equal to $MFD_1$.

This has the advantage of providing a flexible scheme for controlling the spatial extension of the mode field of a guided mode of a photonic crystal fibre.

In a particular embodiment, the micro-structural holes are arranged in a substantially periodic pattern when viewed in a cross section of the optical fibre perpendicular to the longitudinal axis, the periodicity being defined by the location of the centres of the micro-structural elements.

In a particular embodiment, in the second fibre cross section, the cross sectional dimensions of at least the innermost holes are larger than zero.

In a particular embodiment, at least the innermost holes have substantially similar ratio of cross sectional dimension to mutual centre to centre distance $d/\Lambda$ at the first and second cross sections.

In a particular embodiment, the photonic crystal fibre further comprises cladding region surrounding the second core region, the cladding region having a refractive index $n_{clad}$, the singlemode or few mode core region, the second core region and the cladding region being located within the multi-mode core region, wherein the refractive index profiles of the singlemode or few mode and second core regions and the refractive index $n_{clad}$ of the cladding region are adapted to provide a mode field of a guided mode of the optical fibre with a diameter $MFD_1$ at the first end, and a mode field with a diameter $MFD_2$ at the second end, and wherein $MFD_2$ is larger than or equal to $MFD_1$.

In a particular embodiment, the PCF further comprises an intermediate region surrounding the singlemode or few mode core region and being surrounded by the second core region.

In a particular embodiment, the intermediate region is disposed adjacent to the singlemode or few mode and second core regions.

In a particular embodiment, the intermediate region exhibits a predetermined refractive index profile $n_{ir}$ and wherein $n_{ir} < n_{core-1}$ and $n_{ir} < n_{core-2}$.

In a particular embodiment, the geometrically averaged refractive index $n_{g,core-1,ir}$ of the singlemode or few mode core and intermediate regions is substantially equal to the refractive index $n_{core-2}$ of the second core region.

In a particular embodiment, the absolute value of the difference between $n_{g,core-1,ir}$ and $n_{core-2}$ is smaller than $5 \cdot 10^{-3}$, such as smaller than $1 \cdot 10^{-3}$, such as smaller than $0.8 \cdot 10^{-3}$, such as smaller than $0.5 \cdot 10^{-3}$, such as smaller than $0.3 \cdot 10^{-3}$, such as smaller than $0.1 \cdot 10^{-3}$.

In a particular embodiment, the refractive index profile of the singlemode or few mode core region is a step-index-profile with an index-step $\Delta n_1$ down to the refractive index $n_{core-2}$ of the second core region.

In a particular embodiment, $\Delta n_1$ is larger than $1 \cdot 10^{-3}$, such as larger than $5 \cdot 10^{-3}$, such as larger than $6 \cdot 10^{-3}$, such as larger than $10 \cdot 10^{-3}$.

In a particular embodiment, the refractive index profile of the singlemode or few mode core region is a step-index-profile with an index-step $\Delta n_{1-clad}$ down to the refractive index of the cladding material $n_{clad}$.

In a particular embodiment, $\Delta n_{1-clad}$ is larger than $1 \cdot 10^{-3}$, such as larger than $5 \cdot 10^{-3}$, such as larger than $6 \cdot 10^{-3}$, such as larger than $10 \cdot 10^{-3}$.

In a particular embodiment, $\Delta n_1$ is identical to $\Delta n_{1-clad}$.

In a particular embodiment, the refractive index profile of the intermediate region is a step-index-profile with an index-step $\Delta n_2$ up to the refractive index $n_{core-2}$ of the second core region.

In a particular embodiment, $\Delta n_2$ is larger than $0.1 \cdot 10^{-3}$, such as larger than $0.5 \cdot 10^{-3}$, such as larger than $1 \cdot 10^{-3}$, such as larger than $5 \cdot 10^{-3}$, such as larger than $10 \cdot 10^{-3}$.

In a particular embodiment, the refractive index profile of the intermediate region is a step-index-profile with an index-step $\Delta n_{2-clad}$ up to the refractive index of the cladding material $n_{clad}$.

In a particular embodiment, $\Delta n_{2-clad}$ is larger than $0.1 \cdot 10^{-3}$, such as larger than $0.5 \cdot 10^{-3}$, such as larger than $1 \cdot 10^{-3}$, such as larger than $5 \cdot 10^{-3}$, such as larger than $10 \cdot 10^{-3}$.

A Method of Manufacturing an NA Converting Photonic Crystal Fibre

The present invention also provides a method of manufacturing a PCF, the method comprising the steps of:

a) providing a preform comprising longitudinally extending elements comprising tubes or rods with specific cross sectional dimensions, the preform having a fixed end and a drawing end b) optionally sealing at least one end of said preform c) drawing said preform from said drawing end with a predetermined drawing speed in one or more steps including varying said predetermined drawing speed to provide a PCF, having a first end and a second end wherein said first end has cross sectional dimensions that are larger than corresponding cross sectional dimensions of said second end d) optionally applying a controlled pressure to said fixed end of said preform and optionally varying said applied pressure to control cross sectional dimensions of said drawn PCF.

The fabrication of photonic crystal fibres by drawing from a preform is e.g. discussed by Bjarklev, Broeng and Bjarklev in "Photonic Crystal Fibres", Kluwer Academic Press, 2003 (referred to in the following as [Bjarklev et al.]), chapter 4, pp. 115-130, which is incorporated herein by reference. In particular, the fabrication of air-clad fibres may be performed as described by Broeng et al. in WO03019257 and DiGiovanni et al. in U.S. Pat. No. 5,907,652.

Methods disclosed in the above mentioned references may be adjusted to provide optical components according to the present invention. One possibility is to adjust the drawing speed during air-clad fibre drawing, such that cross-sectional dimensions of the PCF are varying in the longitudinal direction.

Several optical components according to the invention may be manufactured by drawing PCF from a preform at a first drawing speed $v_{d1}$ (e.g. in the range 1 m/min to 5 m/min) for a certain amount of time $t_1$ (e.g. 1 to 10 min), and increasing the drawing speed (e.g. a factor of two to four, instantaneously or with a specific rate of change) to a second drawing speed $v_{d2}$, keeping this speed for a certain amount of time $t_2$ (e.g. 0.5 to 5 min) and then reducing the drawing speed $v_{d2}$ to the first drawing speed $v_{d1}$, and then repeating the procedure. By this method several components may be manufactured in a continuous process, thus potentially providing a process suitable for industrial production. The drawn fibre may be cut at appropriate positions to yield a large number of NA converting fibres from a single fibre drawing.

In an embodiment of the invention, the preform design, the drawing temperature $T_d$, drawing speeds $v_{di}$, drawing times $t_{di}$, rate of change of drawing speeds $dv_{di}/dt$, and the optionally applied pressure P to the fixed end of the preform for controlling the hole dimensions are optimized to achieve that the ratio of the maximum cross sectional dimension of the multimode core region to the minimum boundary to boundary distance between neighbouring elements of a ring of elements of the air-clad of the drawn PCF, $D_i/b_i$ is substantially equal at the cross sections of the first and second ends of the PCF. In an embodiment, the ratio $(D_1/b_1)/(D_2/b_2)$ is in the range from 0.5 to 1.5 such as from 0.8 to 1.2, such as from 0.9 to 1.1.

In an embodiment, the tapering of the PCF (i.e. change of the maximum cross sectional dimension of the multimode core region) occurs over a length of the PCF in the range of 0.1 m to 10 m, such as over 0.2 m to 5 m, such as over 0.5 m to 0.1 m.

An Article Comprising an NA Converting Photonic Crystal Fibre

An article comprising a photonic crystal fibre as discussed in section "An NA converting photonic crystal fibre" above, in the detailed description and as defined in the corresponding claims is furthermore provided by the present invention, whereby improved devices performing specific functions such as lasers or amplifiers can be provided.

In an embodiment of the invention, the article is a fibre laser.

In an embodiment of the invention, the article is a fibre amplifier.

In an embodiment, the article is a fibre laser sub-assembly.
In an embodiment, the article is a fibre amplifier sub-assembly.

Use of an NA Converting Photonic Crystal Fibre

Use of a photonic crystal fibre as discussed in section "An NA converting photonic crystal fibre" above, in the detailed description and as defined in the corresponding claims is furthermore provided by the present invention, whereby specific functional features can be achieved in a relatively simple and economic way.

In embodiments of the invention, use is made of a PCF according to the invention in a fibre amplifier or in a fibre laser.

3. An Optical Coupler Comprising a Bundle of Input Waveguides

With reference to the section termed "An optical coupler comprising a bundle of input waveguides" in the Background Art-section above, the inventors have found that to guide high NA light, the cladding must be made with a very low refractive index material, which typically means either air or polymer. The polymer has the aforementioned problems with high optical powers. Using air gives a challenge in the mounting, as the fibre must be suspended to let air surround the fibre. The air-surrounded solution requires that the sides of the taper must be kept clean, since any contamination, such as a dust particle, will scatter light away from the waveguide.

The inventors have thus realised a solution that solves all the following demands.

All-fibre solution, preferably fusion spliced.
All-enclosed solution, where a reduced amount and preferably essentially none of the guided light reach the outside edge of the fibre.
A solution with no use of polymer material in contact with pump light.
A solution where several pump fibres can be used.
A solution where low NA can be converted to high NA without significant loss of optical brightness.

This is done by providing a coupler as defined in the claims.

The coupler comprising in a first end region having a plurality of separate input fibres. A plurality of input fibers includes at least two input fibers. The input fibers may be identical or they may be different from each other. In principle any optical fiber can be used as input fiber. In a second region the input fibres are tapered to smaller dimension and the input fibres are fused together. The tapering section and the fused section may are both included in the second region and are defining the second region. In other word the length section including tapering of individual input fibers and fusing of the input fibers constitutes the second region. The input fibres may be fused together partly or totally in the section where they are also tapered. These fusion and tapering sections may thus be more or less overlapping. The fused-together input fibres may be tapered to smaller dimension; at least in the tapered part of the coupler. The second region in at least a part of its length comprises an arrangement of holes surrounding the input fibers. By the term "an arrangement of holes" is meant an annular cladding with a plurality of holes which is preferably essentially parallel with each other and is extending in the length direction of the coupler. The arrangement of holes may be provided by an outer layer surrounding the more or less fused-together input fibres and comprising an arrangement of air holes surrounding the coupler over at least a length section of its second region. The coupler may further comprise a third section where the input fibers are fully fused to each other. Said third section may preferably include an output end having an air-clad.

The arrangement of holes may e.g. be in the form of a plurality of holes which seen in cross section form a ring of holes. Alternatively the arrangement of holes may be a plurality of holes which seen in cross section form two or more rings of holes or an annular pattern of holes. The size of the holes may be identical or the may vary, periodically or non-periodically. In one embodiment the arrangement of holes is in the form of a plurality of holes which seen in cross section form a ring of holes where the space between the holes are less than the diameter of the smallest hole, preferably the hole has identical diameters.

As the input fibres in the second region are tapered down in dimensions, they will leak some of their light away. By providing the arrangement of air holes surrounding the more or less fused-together tapered input fibre in the second region, it has been found, thanks to the invention, at least a part of this leaking light may be collected and guiding to an output end of the coupler. The output end may then be coupled, for example by fusion splicing or but-coupling, to an air-clad fibre. It is preferred that the output end of the coupler and an air-clad fibre that is coupled to have substantially similar NA and dimensions of the air-clad. This is preferred in order to provide lowest possible coupling losses (highest possible coupling efficiency).

A variety of numbers of input fibres are feasible, for example, 2, 3, 6, 7 or more. The input fibres are typically multi-mode pump guiding fibres with a pure silica core and an F-doped cladding. However, one or more of the input fibres may also be a single mode fibre. The input fibres may have a core dimensions ranging from at least 2 µm to 1000 µm. Typically, single mode input fibres have core diameters ranging from 2 µm to 30 µm, whereas multi-mode fibres have cores ranging from 50 µm to 1000 µm. However, the present invention is not restricted by these dimensions of the input fibres. The multi-mode input fibres are typically characterised by an NA in the range from 0.15 to 0.25, but other values are feasible as well.

In a particular embodiment, the optical coupler comprises at least one input fibre constituted by an optical fibre according to the embodiments described above under the heading '1. A mode field converting optical waveguide fibre' and as defined in the corresponding claims or by an photonic crystal fibre according to the embodiments described above under the heading '2. An NA converting photonic crystal fibre' and as defined in the corresponding claims. This has the advantage of providing a flexible scheme for controlling the spatial extension of the mode field of a guided mode of an optical coupler.

In a further particular embodiment, such an input fibre is centrally located in the optical coupler.

The invention also includes methods for producing such couplers, which includes methods for controlling the size of the air holes along the taper.

Further embodiments are described in the dependent claims.

Further objects of the invention are achieved by the embodiments defined in the dependent claims and in the detailed description of the invention.

It should be emphasized that the term "comprises/comprising" when used in this specification is taken to specify the presence of stated features, integers, steps or components but does not preclude the presence or addition of one or more other stated features, integers, steps, components or groups thereof.

BRIEF DESCRIPTION OF DRAWINGS

The invention will be explained more fully below in connection with a preferred embodiment and with reference to the drawings in which.

The figures are schematic and simplified for clarity, and they just show details, which are essential to the understanding of the invention, while other details are left out.

MODE(S) FOR CARRYING OUT THE INVENTION

Optical components according to the present invention are typically in the form of optical fibre, i.e. flexible light guiding devices. The optical fibres have a longitudinal direction and a cross-section perpendicular thereto. The optical fibre comprises a number of longitudinally extending features that may vary in cross-sectional size along the fibre (a photonic crystal fibre). The variation is in the form of a tapering, providing larger cross sectional feature dimensions in a first fibre end than in a second fibre end. The optical fibre comprises an air-clad. An air-clad is in the present context taken to mean a cladding region comprising holes or voids that surrounds a multi-mode core. As the dimensions of the air-clad are reduced as the fibre is tapered down, the NA of the optical fibre is increased. This is used to provide coupling of light from a large spot/core size and a low NA to a small spot/core size with a high NA.

Most references to physical fibre parameters—such as dimensions—and figures of fibre designs refer to or illustrate a photonic crystal fibre cross-section.

Figure 1:
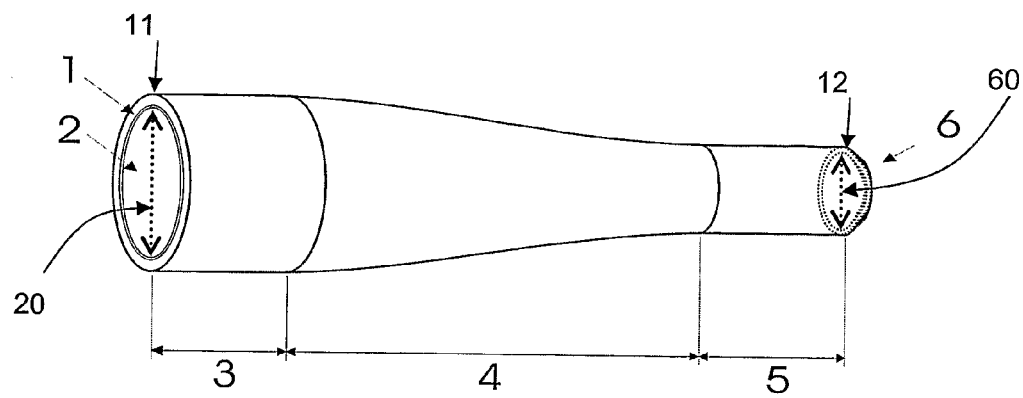
FIG. 1 shows a schematic drawing of an optical component according to the invention.

One preferred embodiment of a photonic crystal fibre according to the present invention is shown schematically in FIG. 1, the photonic crystal fibre having first and second ends or end faces 11, 12. The figure shows a schematic design of a tapered air-clad fibre (TAF). The TAF has a core 2, 6 (typically a core supporting multiple modes—the core being referred to as a multi-mode core). The TAF is characterized by a first section 3 with a relatively large core dimension 20 and second section 5 with a relatively smaller core dimension 60. The difference in core size is a result of a tapered section 4. Light may be confined and guided in the multi-mode core using a ring of holes 1 (referred to as air-clad). The air-clad may extend through the full fibre length or through a majority of the fibre length. The fibre may for example comprise sealed end facets as e.g. described by Skovgaard et al. in WO03032039. Over the length of section 3 the fibre has a large diameter and it is longitudinally uniform, the length of section 3 being arbitrary. Section 4 is a tapered section where the cross sectional diameter of the photonic crystal fibre is reduced from the relatively large diameter in section 3 to the relatively small diameter of section 5. In section 5 the fibre has a relatively small diameter and is longitudinally uniform, the length of section 5 being arbitrary. The tapered section 4 may extend over any convenient length with a view to the light guiding properties of the section. The length of tapered section 4 may e.g. be in the range from 0.5 m to 5 meter, such as from 1 to 3 m.

The fibre in FIG. 1 will typically be used in an application where light is coupled to the core at the first end 11 (for example directly from a laser diode array or from a second optical fibre) with a low NA (typically NA in the range from 0.1 to 0.5) and transmitted through the photonic crystal fibre to the second end 12 with a relatively smaller core 6 and an increased NA. The second end 12 may for example be spliced or butt-coupled to another air-clad fibre, typically an air-clad fibre with a single- or few-mode, rare earth doped core (see e.g. WO03019257). Light may also be coupled between such two fibres using bulk optics. Alternatively, the TAF itself may comprise a rare-earth doped core. Typically, a single- or few mode core is embedded in the multi-mode core (not shown in the figure for reasons of clarity). The TAF may also comprise a passive single- or few mode core. Optionally, the single- or few mode core may comprise UV-sensitive material(s) such that e.g. gratings may be written in the fibre. In this respect, the photonic crystal fibre could be used as a component combining coupling, gratings, and/or gain material.

Figure 2:
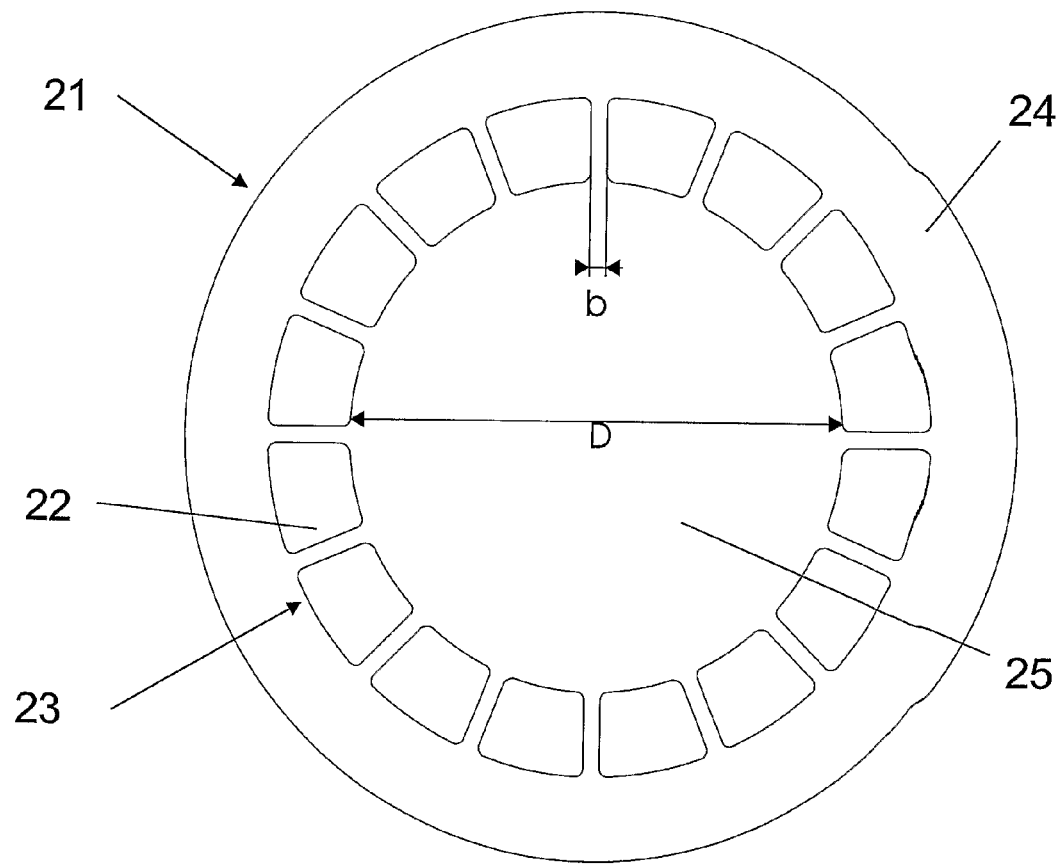
FIG. 2 shows a schematic illustration of a cross-section of a first end of a photonic crystal fibre.

FIG. 2 shows a schematic cross section of an end—or end facet 21—of a photonic crystal fibre realized according to a preferred embodiment of the present invention. The fibre is preferably made from silica. The fibre comprises a ring of holes 22—the air-clad 23. The holes are separated by bridge of solid material (e.g. silica). In the schematic cross section of the fibre of FIG. 2, the width b of the bridge between two neighbouring holes (being defined as the minimum spacing between the outer boundaries said two neighbouring holes of the air-clad) is shown to be essentially constant in a radial direction of the fibre and to be essentially equal for all holes 22 of the air-clad 23. This is preferred but not essential. The bridge for any given neighbouring pair of holes in the air-clad may have a varying width in a radial direction of the fibre, e.g. steadily increasing or irregular (reflecting different cross sectional forms of the holes, including irregularities due to manufacturing tolerances leading to feature forms deviating from ideality and/or intention). Preferably, the holes 22 are air-filled. Outside the air-clad a solid region of silica is placed, the so-called outer cladding 24 that provides mechanical strength and protection of the fibre. Various types of coatings may be applied to the fibre. The region within the ring of air holes is termed the multi-mode core 25 (sometimes also referred to as pump core or inner cladding). Because of the low effective index of the air-clad 23, and a relatively large cross sectional dimension (here diameter), D, of the core, the core 25 (and air-clad 23) may form a multi-mode waveguide with a given NA. The value of the NA depends on the parameter b, as described in details in WO03019257. Hence, the multi-mode core may guide light with a given brightness, e.g. launched from a multimode laser pump diode. As the fibre is tapered down along its length, the parameters D and b are decreased in absolute dimensions. This provides an increased NA and decreased cross sectional core dimension (cf. 60 in FIG. 1). In a preferred embodiment, the photonic crystal fibre has a substantially constant ratio of b and D throughout the length of the photonic crystal fibre, in order to convert the NA while reducing the core/spot size. This may e.g. be achieved by linear dimension scaling through the tapered section (cf. 4 in FIG. 1). The b/D ratio may alternatively be varied along the length to provide further flexibility for converting NA and core/spot size. This may for example be obtained by applying a pressure to the holes forming the air-clad during drawing. The tapering is preferably performed during drawing of the fibre.

In another preferred embodiment of the fibre, the core or parts thereof is doped with rare earth ions, such as Er, Yb, Nd, Ho, Sm or Tm.

Figure 3:
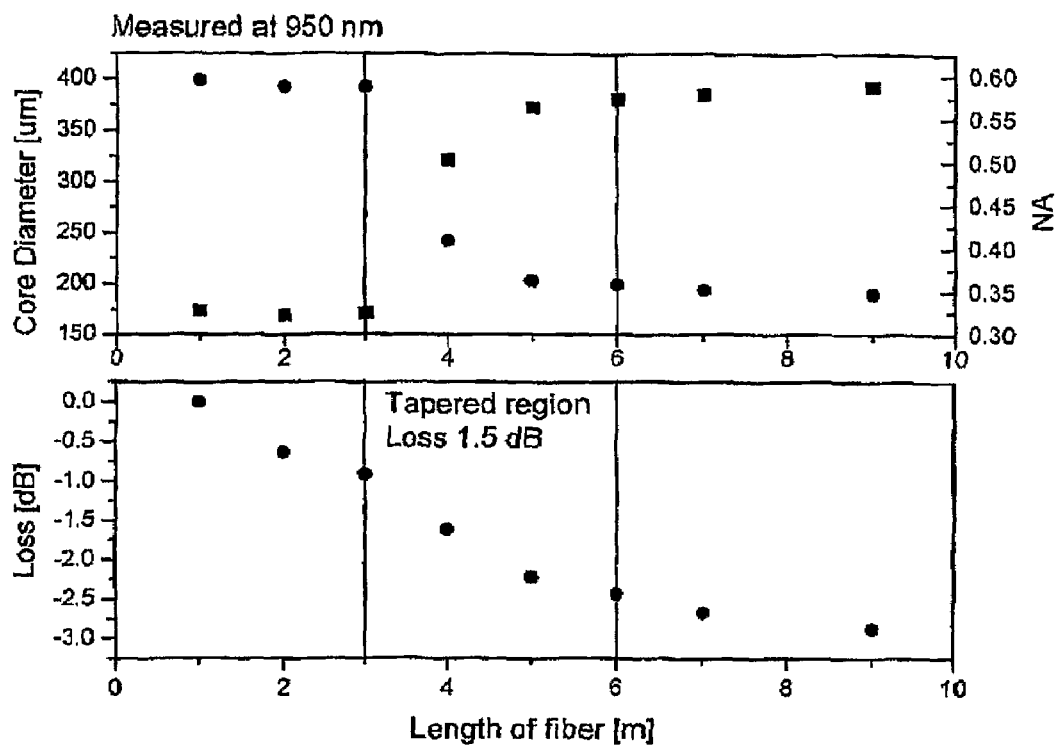
FIG. 3 shows the measured NA, core diameter and losses of a photonic crystal fibre according to an embodiment of the present invention attenuation as function of fibre length.

FIG. 3 shows experimental results from a TAF according to the present invention. In this experiment a 9 m long TAF was used. The large core end has a core diameter of 400 μm at the relatively large end (see numeral 20 in FIG. 1) and a core diameter of 190 μm at the relatively small end (see numeral 60 in FIG. 1). The lengths of first, tapered and second sections 3, 4 and 5 in FIG. 1 were 3 m, 3 m, and 3 m respectively. During the drawing process where the tapering took place, the ratio between core sizes, D, and the width of the bridges between holes, b (see FIG. 2) were kept constant to within production accuracy by adjusting only drawing speed while keeping other drawing parameters as constant as possible (including furnace temperature, preform feeding speed, pressure in holes, etc.). In the experiment, light was launched from the large core end (11 in FIG. 1) and the fibre was cut, seven times, from the other end (12 in FIG. 1) and data recorded for each cut.

In the top diagram of FIG. 3 the solid circles represent the measured diameter of the core (cf. left hand vertical axis denoted 'Core Diameter [μm]') as a function of distance from the first end face 11 to the second end face 12 of the photonic crystal fibre (cf. FIG. 1) (cf. horizontal axis denoted 'Length of fiber [m]'), and the squares represent the measured numerical aperture (cf. right hand vertical axis denoted 'NA'), as a function of said distance. The graph shows that there is a relation between reduced core size and increased numerical aperture that provides NA conversion for changed core/spot size.

In the lower diagram in FIG. 3 the optical loss of the photonic crystal fibre (cf. left hand vertical axis denoted 'Loss [db]') is plotted as a function of length of the photonic crystal fibre from the first end face 11 to the second end face 12 of the photonic crystal fibre (cf. FIG. 1). A comparison of loss (lower diagram) with the diameter of the core (top diagram) shows that there is no significant relation between loss and variations of core dimensions (as there are no abrupt or dramatic changes for the loss over the tapered section compared to the untapered sections). Further it can be seen that the loss in the tapered region (over the length of around 3 m), for this device, is approximately 1.5 dB. Such a loss level is comparable or low compared to what can be obtained using bulk optics for NA conversion and spot size reduction, in particular this is low for NA conversion up to around 0.50 or higher. Hence, the TAF provides a fibre-based alternative to bulk optical devices. A fibre-based alternative is attractive for many reasons; including reduced cost, improved connectivity to other optical fibres/fibre-based components, improved mechanical stability, and many more.

It is important to notice that the increase in NA as the core is decreased cannot be obtained using a conventional (non-micro-structured) double clad fibre. For conventional double clad fibres, NA is determined by absolute refractive index differences between a high-index, multi-mode core and a low-index cladding formed typically using low-index polymer. Tapering down the size of such a conventional fibre would reduce the core/spot size, but leave the NA unchanged (as the polymer does not change its refractive index). Hence the brightness would not be conserved for a conventional fibre, as is possible by preferred embodiments of the present invention.

Figure 4:
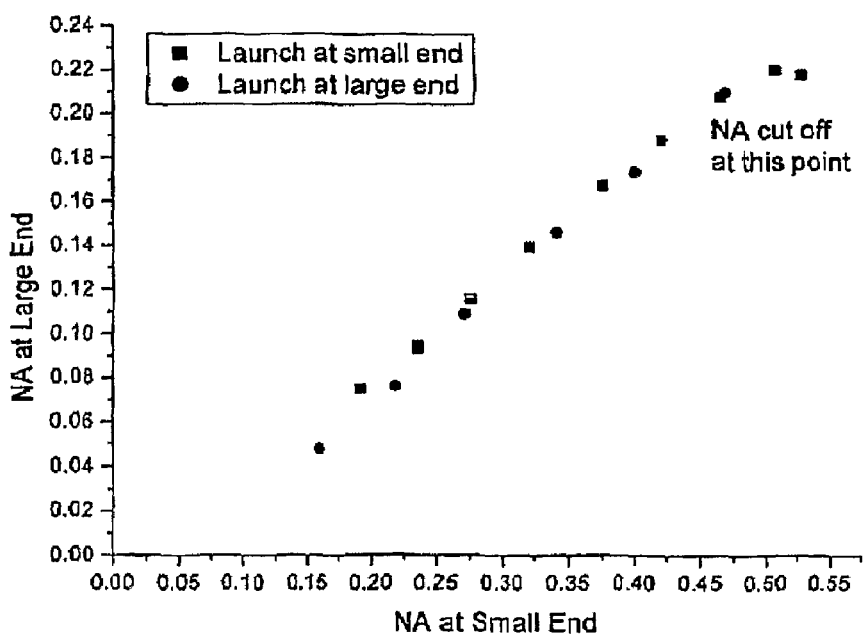
FIG. 4 shows the NA conversion from one end to another end of a photonic crystal fibre according to an embodiment of the present invention.

FIG. 4 shows relationship between launched NA and transmitted NA (Launched NA and transmitted NA being numerical aperture at first 11 and second ends 12, respectively, of a photonic crystal fibre according to preferred embodiments of the present invention (cf. FIG. 1)). The graph in FIG. 4 demonstrates that the fibre can be operated bidirectionally. The fibre used in this experiment is the full length of the fibre used for the data in FIG. 3. The solid squares show the numerical aperture when launching light into the relatively small core (numeral 6 in FIG. 1) as a function of the detected numerical aperture in the large core (numeral 2 in FIG. 1). The solid circles show the numerical aperture when light is launched into the large core (numeral 2 in FIG. 1) as a function of the detected numerical aperture in the small core (numeral 6 in FIG. 1). From the overlap of the data points it can be deduced that the fibre is bidirectional and that it linearly transform from one numerical aperture to another.

Figure 5:
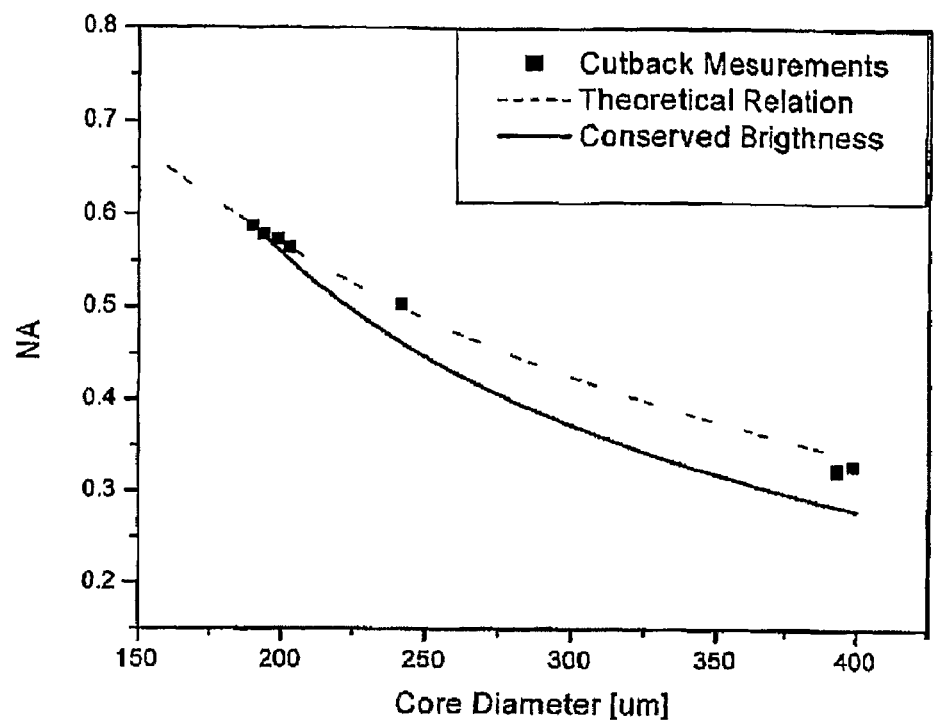
FIG. 5 shows measured NA as function of core size of a photonic crystal fibre according to an embodiment of the present invention.

The diagram in FIG. 5 shows relationship between numerical aperture and core diameter. The solid squares represent experimental data from the top graph in FIG. 3 (solid squares also in FIG. 3, top). The stapled line represents the calculated numerical aperture for different core sizes where the ratio between core size, D, and bridge width, b, is kept constant, i.e. the structure scales linearly. For the calculation of numerical aperture from the bridge width the empirical formula in WO03019257 (FIG. 30) is used. The bridge width is 400 nm for the 200 μm core. The experimental data confirms that the structure dimensions scale linearly through the tapered section.

The solid line represents conservation of luminance, with a fixed point at the small core end (numeral 12 in FIG. 1). The behaviour of this particular fibre can be deduced from this graph. If light is launched into the small end with maximum NA, all light will be transmitted through the fibre. However, when light is launched from the large core size end, this fibre does not support the increase of NA required for conservation of brightness and only light with NA supported by the small end is guided—a fraction of the light is therefore lost. It is desired to keep this loss as low as possible. This may, for example, be obtained by decreasing the b dimensions slightly more than the dimensional downscaling of D. In other words, to increase the D/b ratio slightly over the tapered section (4 in FIG. 1) from large to small core size. This may, for example, be achieved by applying an increased pressure to the holes during drawing when the drawing speed is increased to taper down the fibre.

It may, however, in some cases be an advantage that a small fraction of the light is lost. Considering a device used to pump a double clad fibre; the advantage is that if light emitted from a pump diode is not well defined, the dumping of energy that is not within a specified NA can be done along the length of the tapered fibre and thus not lose all energy at one point. Hence, physical damage from dumping high excess powers at spatially narrow positions may be avoided. Therefore, preferred embodiments of the present invention may be used to obtain high power devices with well-defined NA and spot sizes (the NA and core size being determined from the small end).

Figure 6:
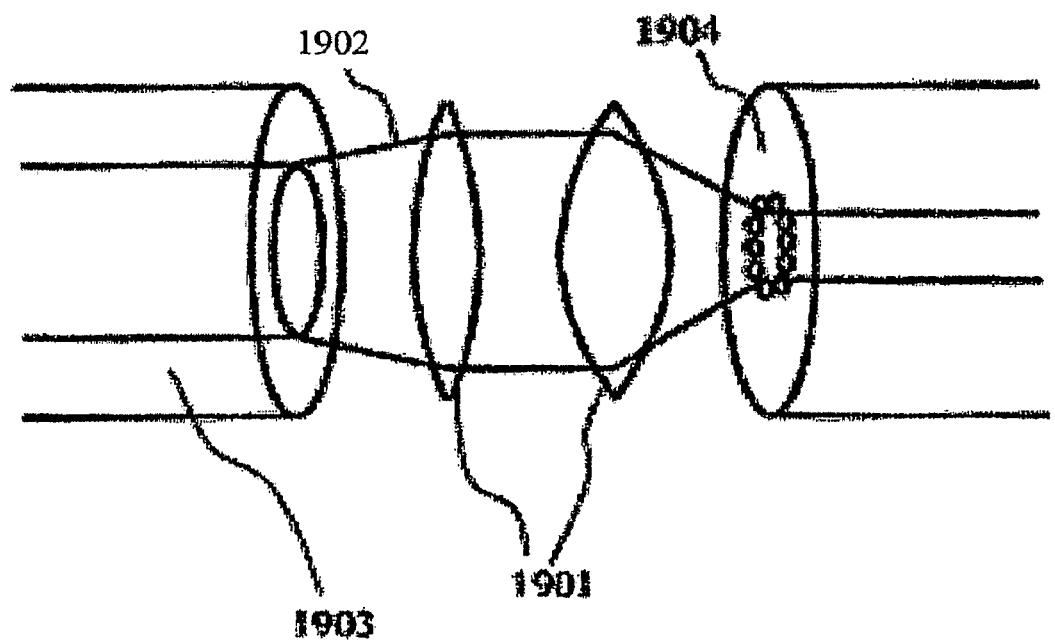
FIG. 6 schematically shows a prior art lens system to couple light from one optical fibre to another.
Figure 7A:
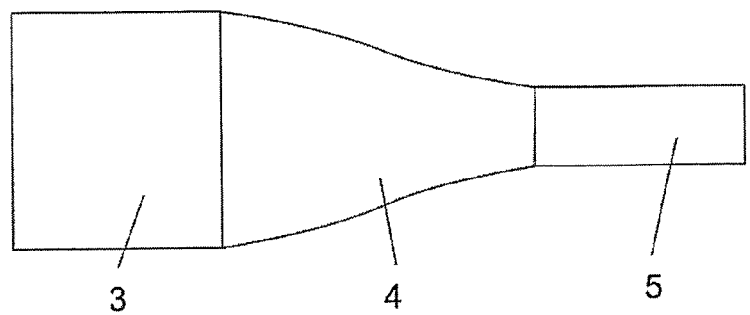
FIG. 7 schematically shows elements of an article according to the invention.

FIG. 6 schematically shows a prior art lens system to couple light from one optical fibre to another wherein light 1902 originating from a high power semiconductor laser pigtailed to a standard (i.e. non-micro-structured, solid glass) MM fibre 1903 is coupled to a double clad fibre 1904 via bulk optics in the form of lens system 1901. A PCF according to the present invention may substitute the lens system 1901 as indicated on FIG. 7. This shows schematically elements of an article according to the invention. In FIG. 7a, lens system

Figure 7B:
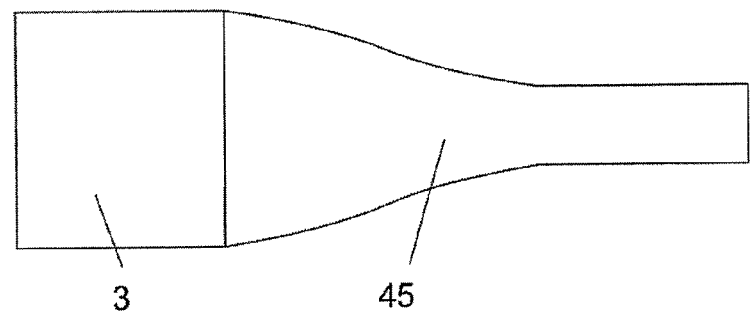
Figures 7C, 7D, 7E:
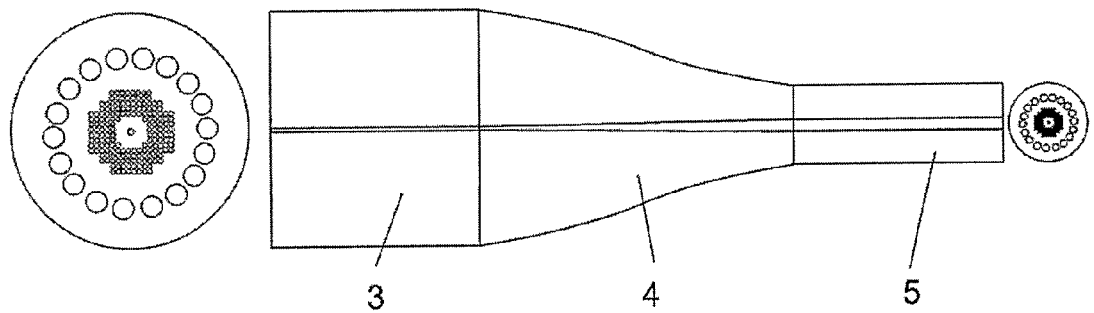

1901 of FIG. 6 is substituted by the tapered PCF 4, and elements 3 and 5 corresponding to multimode fibre 1903 (providing pump light) and double clad fibre 1904 (e.g. being part of a fibre laser or amplifier) of FIG. 6. The multimode fibre 1903 may alternatively be a laser diode, a laser diode array, a lens system or any other component or device feeding pump light to the tapered PCF 4. The component 1904 may or may not be in contact with the tapered fibre 4 (splices, butt-couplings, lens-couplings, etc may be imagined). FIG. 7b schematically indicates an article according to the invention wherein the tapered PCF and the double clad fibre (e.g. for implementing a laser or amplifier) are integrated into one component (PCF) 45, thereby avoiding losses due to coupling/splicing between the corresponding discrete elements (4 and 5 in FIG. 7a).

Figure 8:
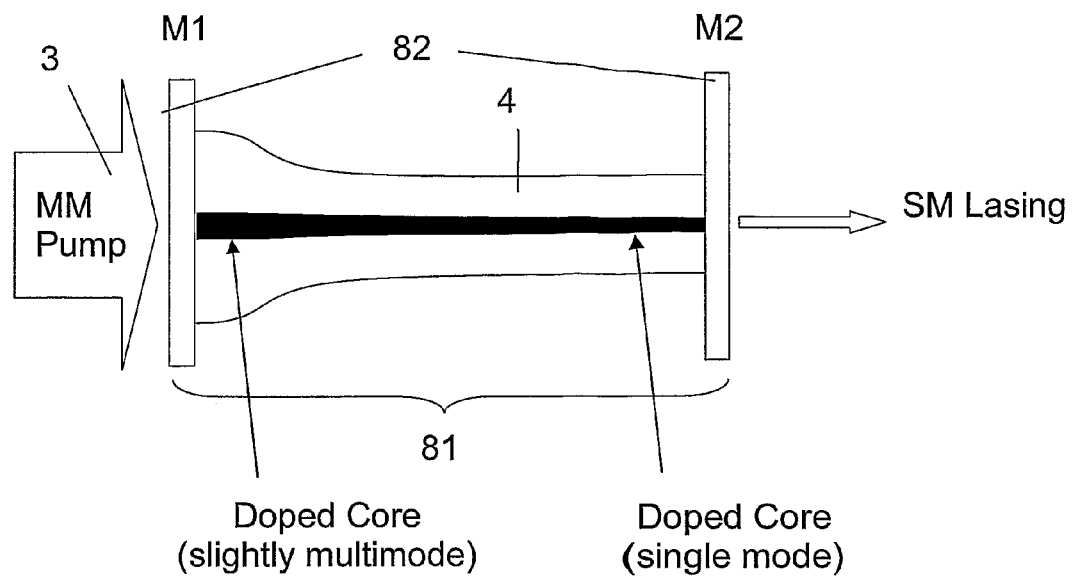
FIG. 8 shows an article according to the invention in the form of a laser.

FIG. 8 shows an article according to the invention in the form of a fibre laser 81, comprising a section of a tapered PCF 4 having a multimode core region comprising a centrally located doped core, which at a first end is slightly multimode (MM) and at a second end is single mode (SM). A first reflecting M1 element is located at the first end of the PCF having a relatively large cross sectional dimension and a second reflecting element M2 is located at the second end having a relatively smaller cross sectional dimension. The reflecting element(s) may be fibre Bragg gratings, external reflectors, end-facet reflectors, etc. The component is optically coupled at its first end from a multimode pump source 3 (e.g. an array of laser diodes possibly coupled directly into the PCF 4 or via an appropriate optical waveguide) and at its second end optically coupled (e.g. butt-coupled) or integrated with (i.e. being part of the same optical waveguide) to a fibre laser. The following relation is substantially fulfilled for the cross sections of the first and second ends of the PCF:

$$D_{core,1}/D_{MM\ core,1} = D_{core,2}/D_{MM\ core,2}$$

The multimode core dimension ($D_{MM\ core,i}$) corresponds to the parameter D of FIG. 2 as given at said first (i=1) and second (i=2) ends of the tapered PCF 4. $D_{core,i}$ indicates the cross sectional dimension of the doped core at the first and second ends, i=1, 2, respectively.

At the pump end (first end) $D_{MM\ core}$ is relatively large, allowing efficient, easy pump coupling, but absorption is the same as at the second end, while retaining single mode output. One or both of the reflecting elements 82 may e.g. be implemented as fibre Bragg gratings.

Figure 9:
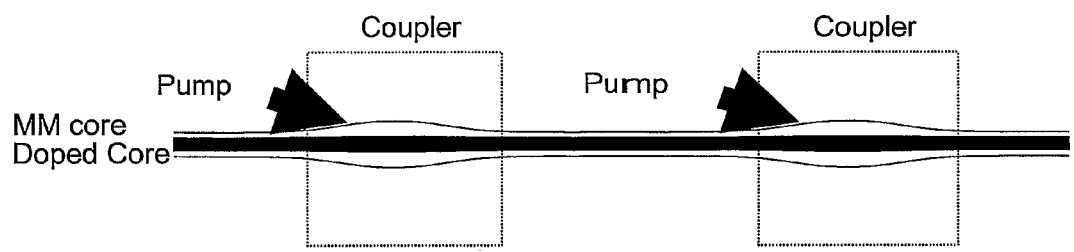
FIG. 9 shows an article according to the invention in the form of a coupler.

FIG. 9 shows an optical component according to the invention in the form of an optical coupler, comprising sections of a tapered PCF (comprising an up- as well as a down-tapering) having a multimode core region (denoted 'MM core' in FIG. 9) and comprising a centrally located doped core. The fibre may be side-pumped (see e.g. WO03079077 for details of side-pumping air-clad fibre) at one or more positions. Preferably, the side pumping is performed at positions of larger dimensions. The larger dimensions may be advantageous positions for the side pumping due to easier handling, larger volumes of glass to receive (high) optical power. Hence, the enlargement of the inner-clad cross-section in the coupling region may lead to an increased coupling efficiency and better power handling, thereby facilitating coupler fabrication.

Figure 10A:
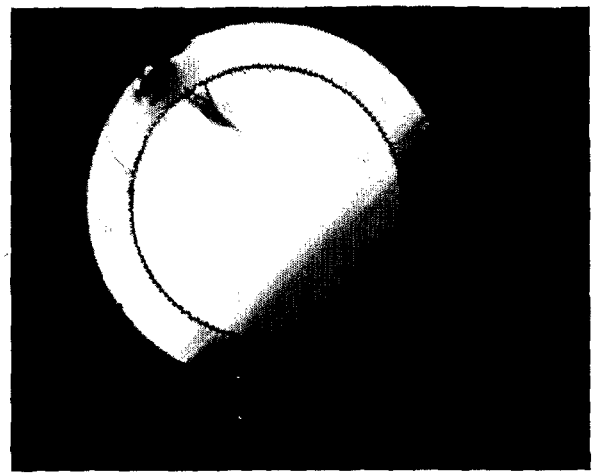
FIGS. 10a and b show cross-sections of a large end and small end, respectively, of an optical fibre according to the invention.
Figure 10B:
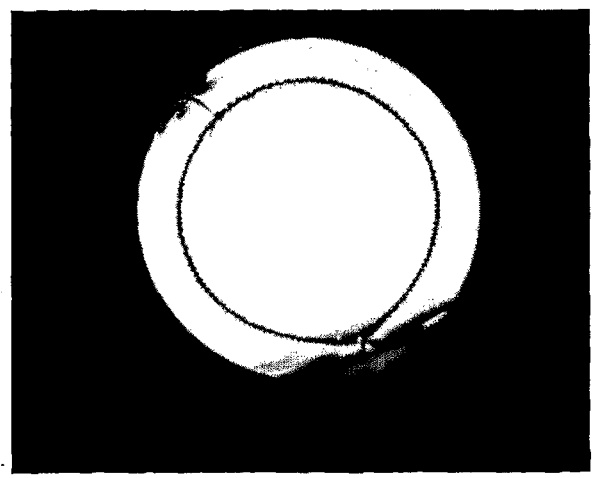
FIG. 10c is a cut-back measurement showing the loss for a tapered fibre according to a preferred embodiment of the invention.
Figure 10C:
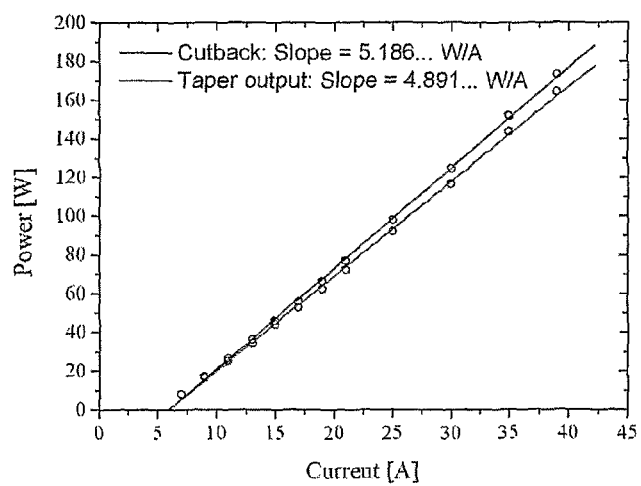
Figure 11:
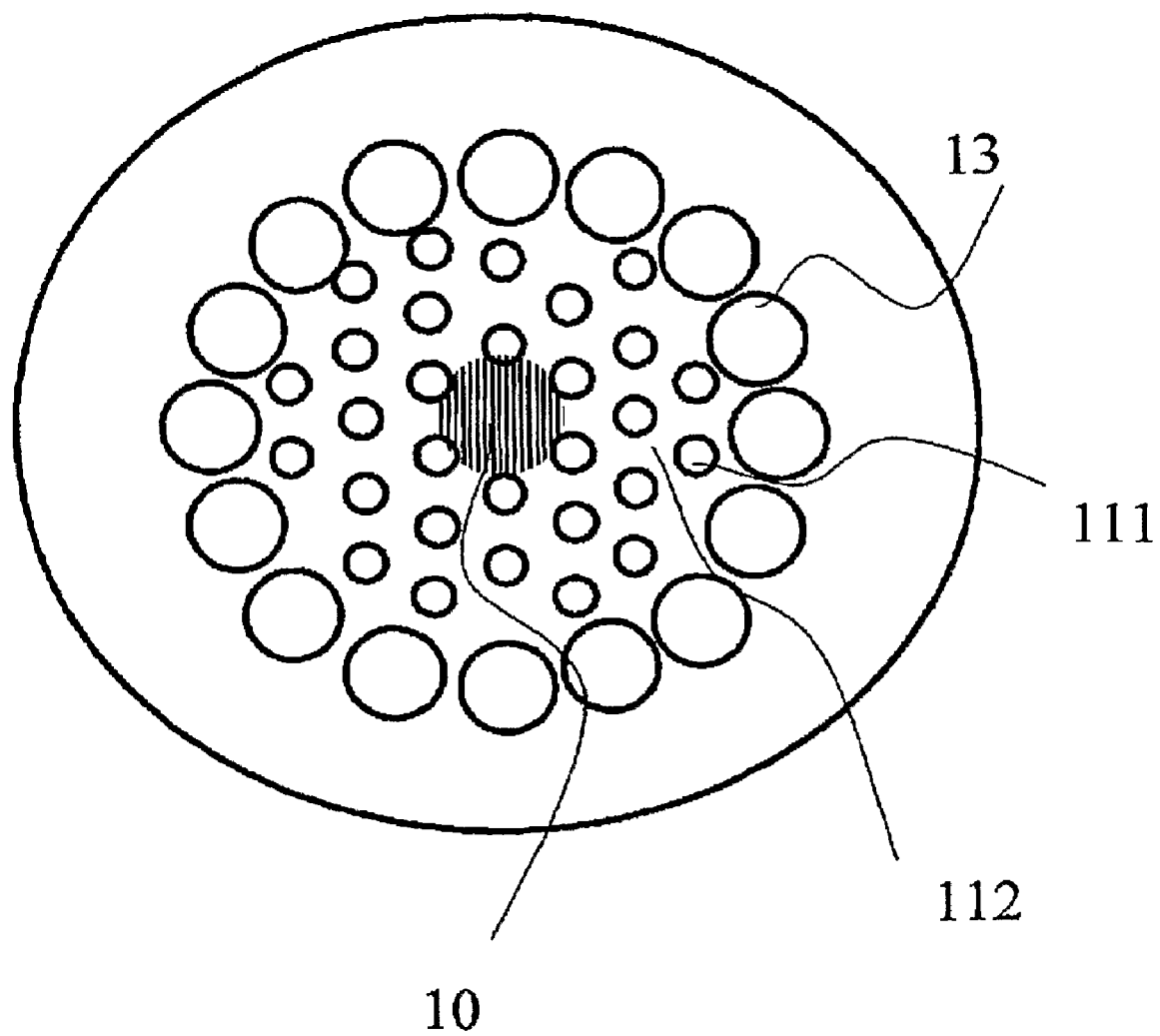
FIG. 11 shows schematically the end face of a double cladding (also known as air-clad) Photonic Crystal Fibre after cleaving. The ring of closely spaced, larger holes surrounding the multi mode guide can be seen. The smaller holes within the inner cladding defining the core can also be seen.
Figure 12:
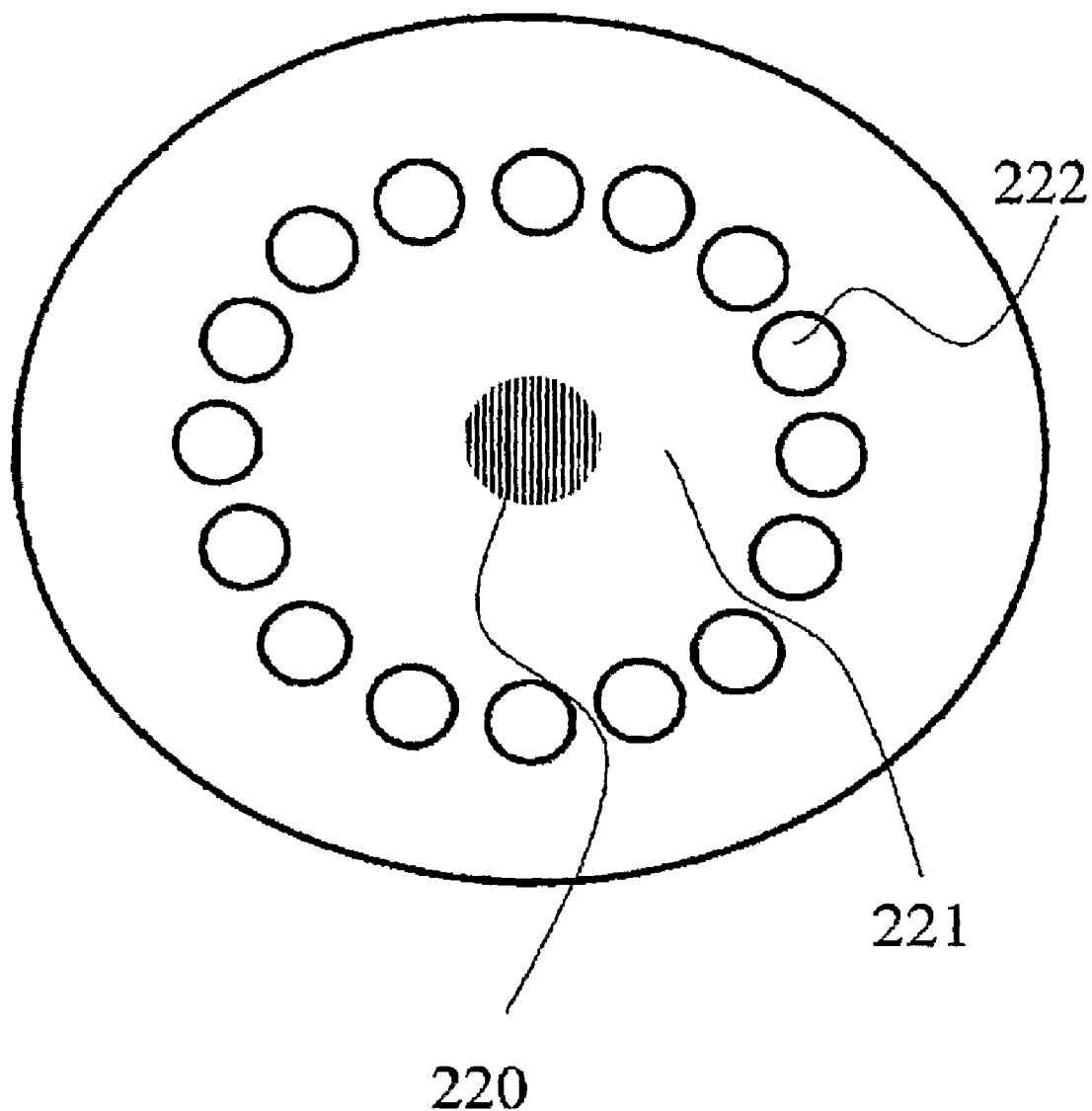
FIG. 12 shows schematically the end face of a double cladding Photonic Crystal Fibre after cleaving. The ring of closely spaced, larger holes surrounding the multi mode guide can be seen. Here, the single mode core is defined through control of the refractive index.
Figure 13:
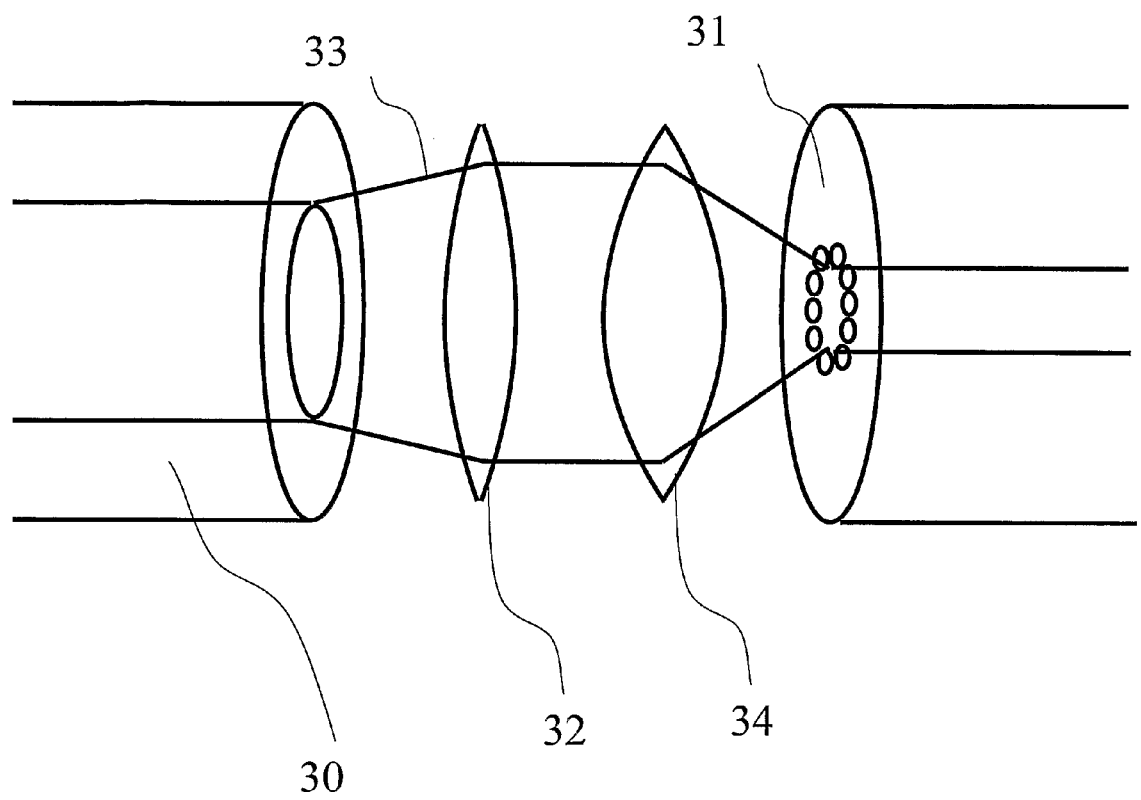
FIG. 13 shows schematically a typical method for coupling lower NA light from a pump fibre into the higher NA PCF.
Figure 14:
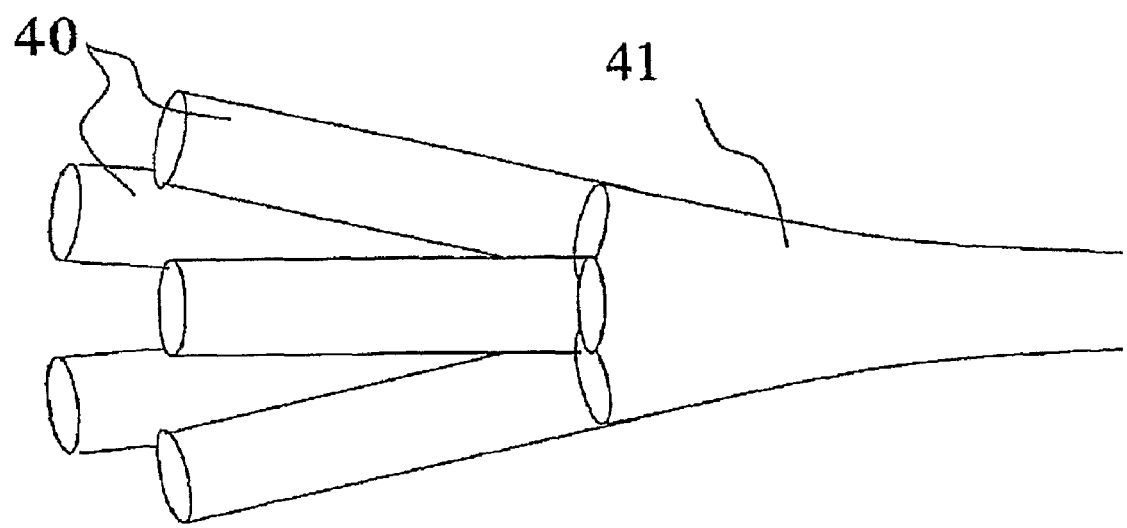
FIG. 14 shows schematically a tapered, fused pump multiplexer as it is realised with non-PCF technology.

FIGS. 10a and b show microscope photographs of cross-sections of a large end and small end, respectively, of an optical fibre according to the invention. The photographs are of the optical fibre that the measurements in FIGS. 3, 4, and 5 are for. FIG. 10a shows the large end recorded using 10× microscope objective lens, and FIG. 10b shows the small end recorded using 20× microscope objective lens. Slight damage on one side (lower right side) of each fibre is seen due to bad cleaving. FIG. 10c is a cut-back measurement showing the loss for a tapered fibre according to a preferred embodiment of the invention. The measurement is done for a tapered fibre with a length around 1.5 m. The thick, end of the fibre has a multimode core with a diameter around 400 μm and an NA of 0.22 and the thin end of the fibre has a multimode core with a diameter around 220 μm and an NA of 0.40. The measurement was done for the taper being spliced to fibres at both ends and a total loss of less than 0.25 dB was recorded at a power level of 200 W and a wavelength of 976 nm. This corresponds to an efficiency through the tapered fibre of around 94%. For comparison, obtaining a similar conversion using bulk optics would yield an efficiency of around 84% (Fresnel reflections are avoided).

As stated before, there is a need for devices and methods of coupling the output from several semiconductor diode pumps into one high NA, double cladding fibre. It is an object of the invention to provide an all-fibre, all-silica, high NA coupler solution without exposed waveguides.

In the following a method of fabrication according to a preferred embodiment of the present invention will be outlined. For illustrative purposes there is chosen a specific example of a coupler with 7 input fibres. The input fibres are all-glass solid MM fibres with an NA of 0.22 and core/cladding diameters of 105 μm and 125 μm, respectively.

Figure 15:
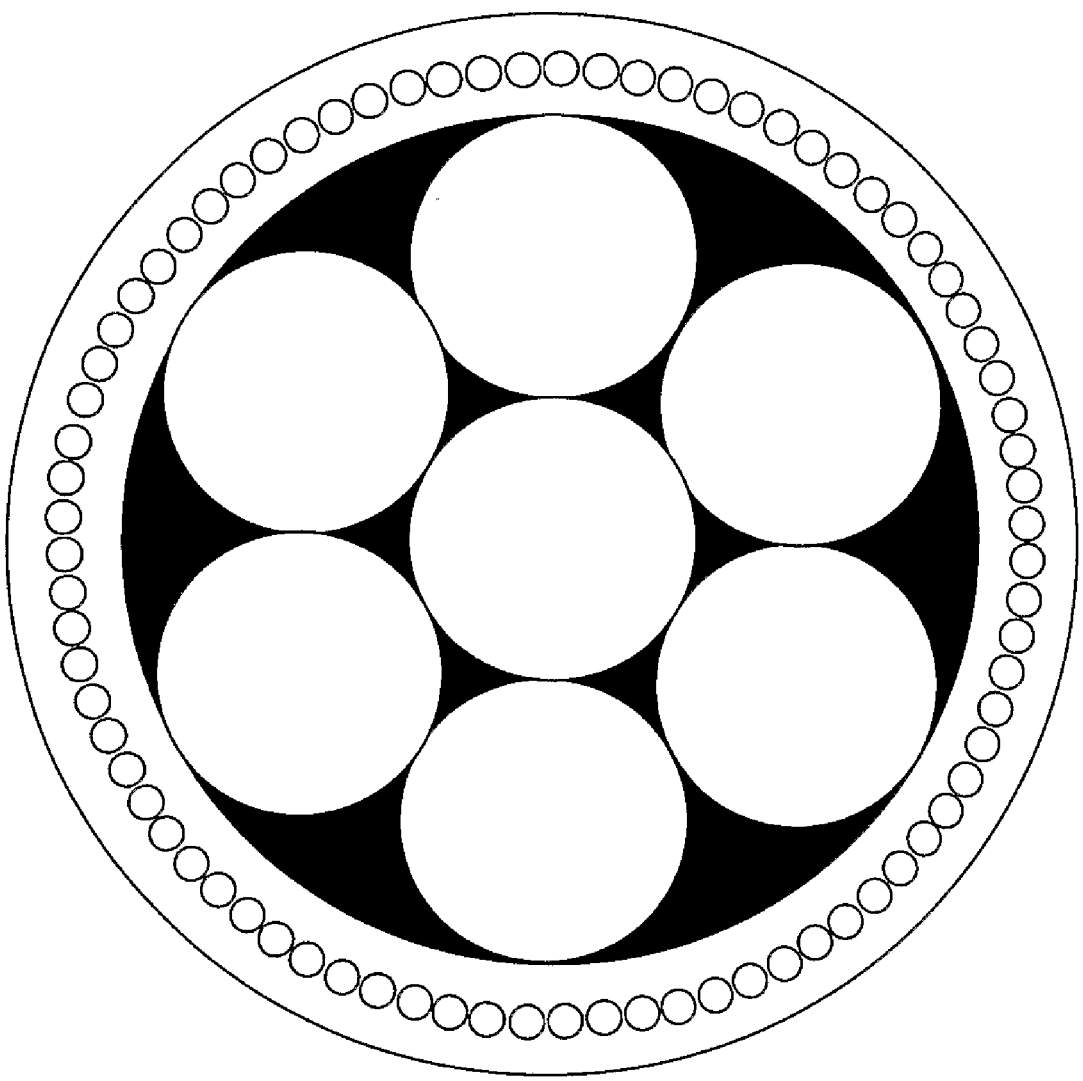
FIG. 15 shows schematically how the individual input fibres may be positioned when inserted into a ring element, during the production of a coupler according to the invention.
Figure 16:
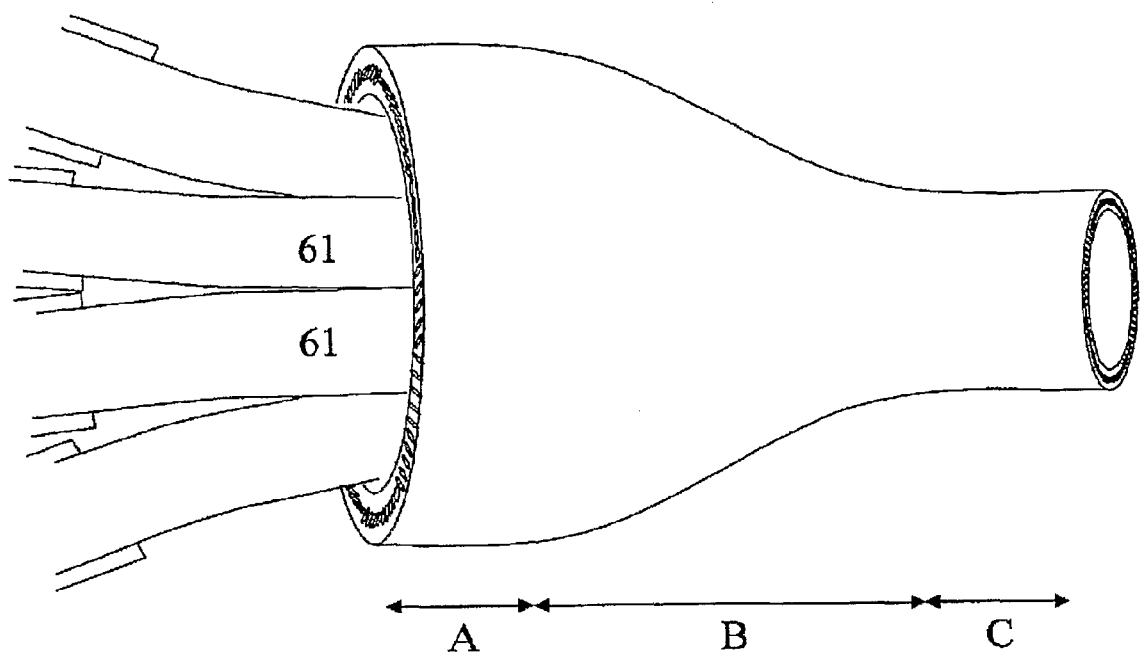
FIG. 16 shows schematically a preferred embodiment of the present invention. Individual input fibres 61 have been inserted into a ring element and the assembly of ring element and input fibres has been tapered down in size (section B which is the second region). At the output end (section C which is the third section), the coupler is an air-clad, MM fibre.

The ring element is basically two thin tubes of glass with a large number of holes situated in between (see afore-mentioned reference WO03078338). Typically there are more than 100 holes in such a structure. The ratio between the inner and outer diameter is typically about 0.8. The inner diameter is in this example chosen to allow 7 input fibres to be slid into the tube (see FIGS. 15 and 17). This means that the inner diameter must be chosen larger than 375 μm in the case of the outer diameter of the input fibres being 125 μm.

Cleaving and sealing the ring element: Since the ring element is made of all-glass it is easy to cleave the ring element at a well-controlled length. The cleaving may for example be done by scratching the ring element with a diamond tool and applying a mechanical force to cleave the ring element at the scratched position. A typical length range will be 6-12 cm. A well-controlled, short duration heating of the end of the cleaved ring element will melt the end and thus hermetically seal the holes. It is preferred that the inner diameter of the ring element is substantially maintained.

Figure 17:
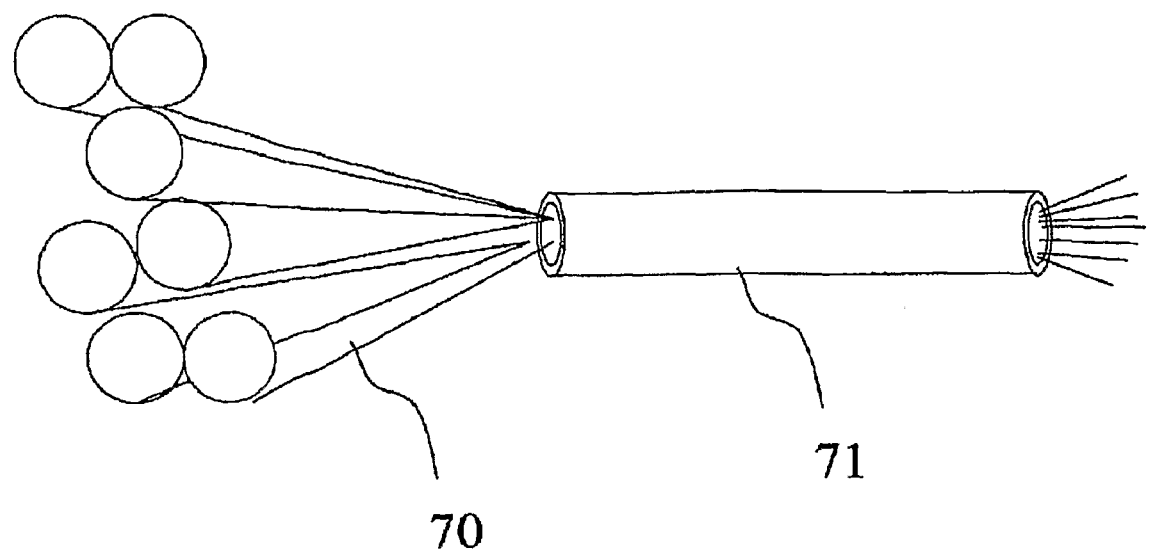
FIG. 17 shows schematically how a number of pump fibres are inserted in a ring element.
Figure 18A:
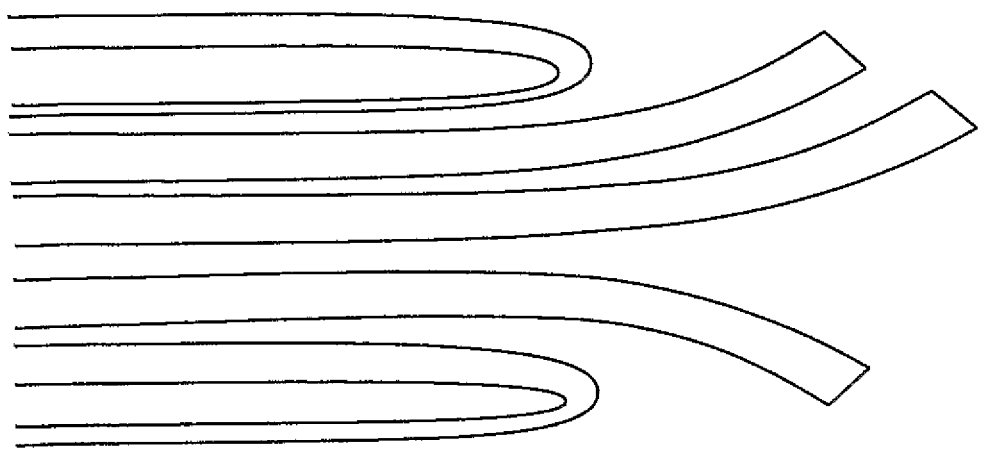
FIG. 18 shows schematically how hermetically sealing of one end of the ring element allows individual pressure control of the inner holes.
Figure 18B:
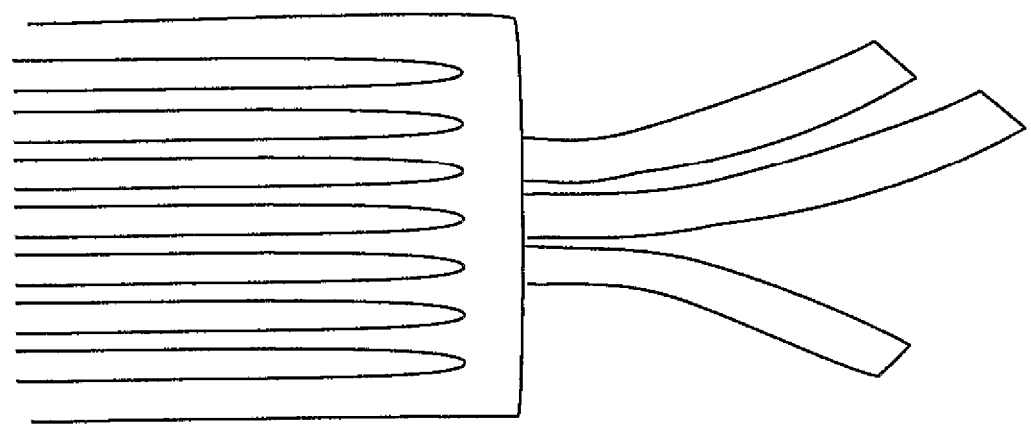

Stripping and inserting the input fibres: As an example, 7 lengths of standard MM fibres are stripped at a length 3 cm longer than the ring element. The input fibres 70 are slid into the ring element 71 as shown in FIG. 17, such that part of their length is within the center opening of the ring element, and part of their length is outside 70. Hence, the input fibres have individual, separate ends that may be coupled to from individual light sources.

It is preferred to apply pressure control (for example vacuum) during fabrication. A silicone tube may be attached to one end of the ring element (typically the opposite end of the end wherein input fibres have been inserted). The silicone tube can be connected to a vacuum pump that will force interstitial holes (marked as black regions in FIG. 15) to collapse when heating the ring element that comprising input fibres.

Figure 19:
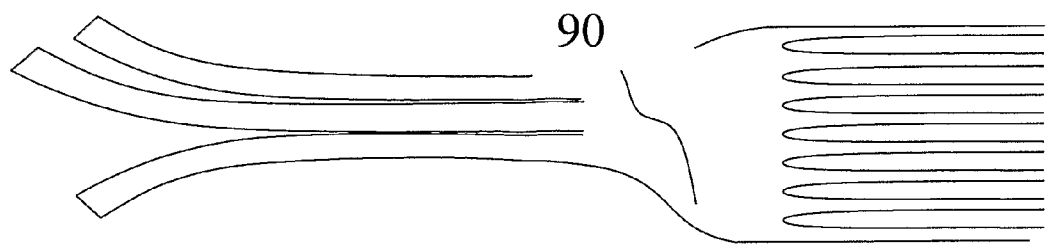
FIG. 19 shows schematically an example of how heating near the input end will collapse all cavities and holes and thus hermetically seal this end.
Figure 20:
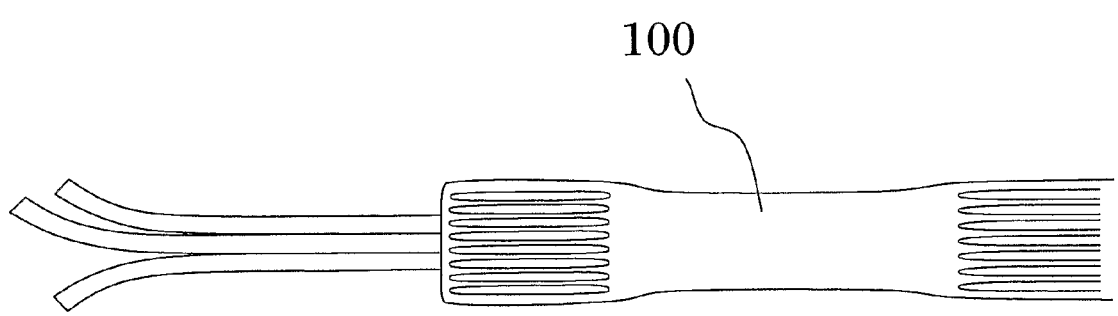
FIG. 20 shows schematically another example of how heating some distance from the input end will collapse all cavities and holes and thus hermetically seal this end.

It is preferred to sealing the input end during fabrication. This is done to fixate the position of the input fibres within the ring element as shown schematically in FIG. 19. This allows pressure control inside the ring element. The sealing can be done at the end of the ring element 90 (FIG. 19), or some distance 100 from the end (FIG. 20). In either case, the heating should be strong enough to allow surface tension to collapse all holes. Note that there may be no tapering in this step. This means that the core diameter of each individual MM fibre may remain unaltered. The core might no longer be circular, but due to gradual deformation, optical loss out of the core can be kept at a minimum. Note, that even if this should happen, there are still the holes in the ring element to guide this light.

Mounting in taper machine: In a preferred embodiment, a commercial splicer like the Vytran LDS-1250 is use for heating and tapering. This machine is specially designed to be able to produce well-controlled tapers. Of course, also other heating/pulling arrangements could be made. The ends of the ring element are attached at the fixtures. Note that since the input fibres are melted into the ring element, this mounts securely all elements.

Heating and tapering: Simultaneous heating and pulling will allow well-controlled tapering, both in terms of reduction ratio, final diameter and taper shape. The setup is sketched in FIG. 21.

Figure 21:
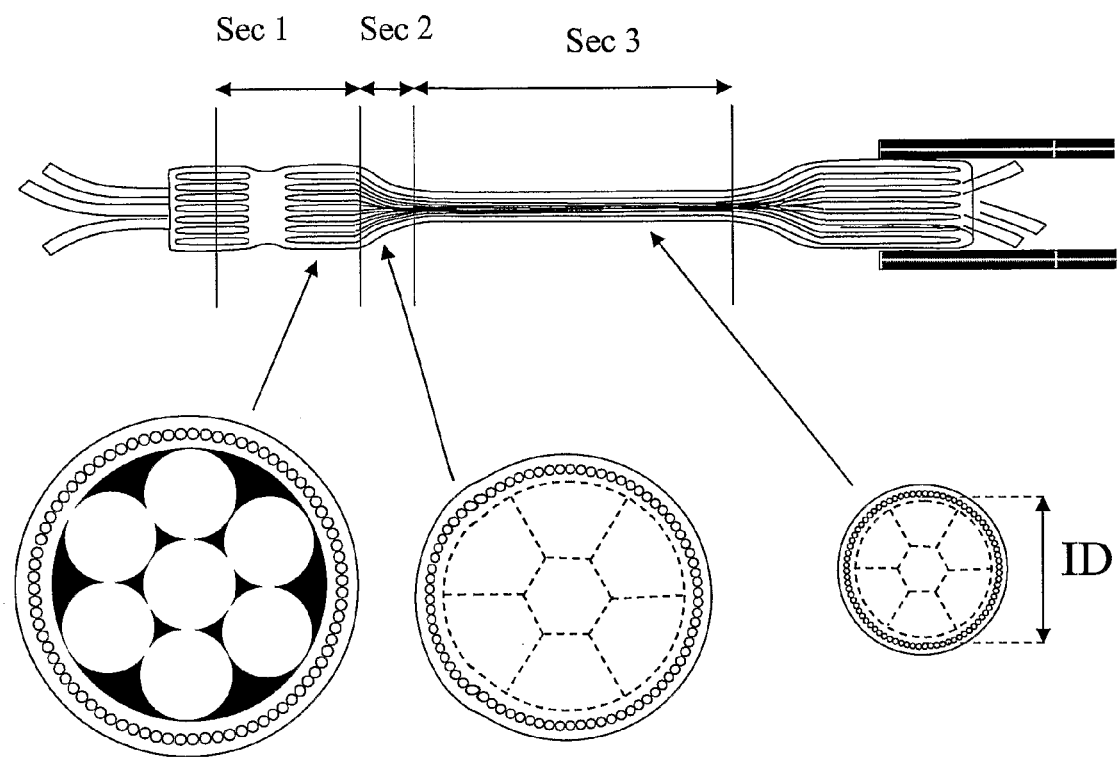
FIG. 21 outlines schematically a preferred embodiment of a method and a coupler according to the present invention. Vacuum is provided with a rubber hose at the right hand side. Combination of heating and pressure control at region 2 (second region) will collapse the interstitial holes and fuse together the input fibres. The input fibres are separate (loose) in the input end. Note that the interstitial holes may collapse without significant diameter change of the individual MM cores, if tapering is not performed during the heating. The additional initiation of mechanical pulling (at region 3 (third region)) will taper the diameter down to the desired dimension. The three inset show the cross-section of the coupler at the sections 1, 2 and 3. The coupler is cleaved in region 3 to provide the final output end of the coupler. Inset 3 shows the end facet of the output end of the coupler (dashed lines indicate fused together interfaced between input fibres, as well as between input fibres and inner part of the ring element. The holes in the ring element are kept open due to internal pressure in the sealed off holes.

Cleaving: the taper is preferably cleaved somewhere within region 3 in FIG. 21. For input fibres comprising a high-index core and a low-index cladding (for example a pure silica core and an F-doped cladding), the up-doped core material is still embedded within the ring of holes. This might result in an inhomogeneous distribution of the guided light at the output of the coupler. However, as long as the light is guided within the NA of the ring element, this is not a problem as the light may be coupled to a high NA, air-clad fibre with matching NA and air-clad dimensions. By matching air-clad dimensions is meant that the dimension of the inner cladding (or pump core) of an air-clad fibre with an active core is matched to the inner dimension of the air-clad in the output end of the coupler. This dimension is marked ID in FIG. 21.

Note that mode mixing in an air-clad fibre that pump light is coupled to via the coupler will typically homogenise the pump light distribution.

Splicing to an air-clad, active fibre: Since the output end of the coupler and the air-clad fibre are preferably designed to fit each other, splicing these two together with high quality optical performance is feasible using standard splicing equipment, such as Vytran FFS 2000, using suitable adjustments of splicing parameters, including temperature, heat, exposure time etc.

To make coupling efficient, one must try to conserve the brightness of the light. That is the same as saying that the NA multiplied with the waveguide diameter must be constant throughout the entire taper and that the transmission loss must be low. As an example, if the NA is increased from 0.22 to 0.6, the diameter can be reduced to about one third of the size. Note that this means that the intensity increases by a factor of 9.

It has been found that it is possible to taper a multi-mode (MM) fibre with relatively low loss—this is demonstrated in Danish Patent Application PA 2004 00447 that is incorporated herein by reference. As an example, a passive air-clad fibre (a fibre comprising a large MM silica core and an air-clad) was tapered down while efficiently conserving brightness. Reducing the diameter by a factor of 2 and increasing the NA accordingly through the reduction in wall thickness between holes in the air-clad, transmission was better than 98% and brightness was reduced by less than 2%.

Assume that the NA of the input MM fibre is 0.22. It is desired to make a MM fibre with an NA of 0.6, the core diameter can be reduced by 0.6/0.22=2.7. As stated before such a high NA cannot be supported using polymer cladding (and also polymer cladding is undesirable due to high power reliability). Such a high NA is possible using an air-clad.

In the following further description of the tapering shall be given.

The present inventors have realised that tapering can be made for ring elements such as those described in WO03078338. Also such ring elements comprising a plurality of input fibres inserted into their center hole may be tapered down. The tapering may be performed using commercially available tapering equipment as for example from Vytran. Ring elements and their fabrication are disclosed in WO03078338 that is incorporated herein by reference. See e.g. FIG. 17b in WO03078338, where a schematic illustration of a ring element that may be used for the present invention is shown. Typically, the ring element, before tapering, has inner dimension (dimension of opening) in the range from around 200 μm to around 3000 μm. The holes in the ring element may maintain their relative sizes during tapering, this means that the entire structure reduces in size. Also the wall thickness, that is, the size of the glass material in-between the holes around the MM core reduces in size (the MM core meaning the fused-together input fibres and part of the ring element inside the ring of holes (for example the region of dimension ID, as indicated in FIG. 21)). It is a further advantage that since the NA is almost linearly dependent on this thickness (as described in WO03019257), a down taper will automatically mean an increase of the NA. This means that the ring element can be made with fairly large wall thicknesses and thus fairly robust. As the ring element is tapered down, the fairly large wall thickness is reduced and the NA is increased. Hence, in an output end (where the ring element has the smallest dimension of the taper) the NA is highest.

The present inventors have further found that down-tapering can be done on ring elements comprising solid material with low transmission loss. For example, a down-tapering of a MM, air-clad fibre can be done while efficiently conserving brightness. Reducing the diameter by a factor of 2 (and increasing the NA accordingly), transmission has been found to be better than 98% and brightness maintained to within 2%.

A Mode Field Converting Optical Fibre

In applications such as pump couplers and pump tapers used as interface to a double clad optical fibre e.g. in a fibre laser or amplifier as disclosed above, there is a need for maintaining or even expanding the absolute size of the mode field (e.g. the mode field diameter, MFD) in the face of a down tapering of the waveguide of e.g. a factor of 2 or 3, cf. the schematic situation of the taper of FIG. 1. The down tapering of the waveguide causes a scaling down (i.e. a decrease) of dimensions of outer and inner characteristics of the optical waveguide, cf. the exemplary schematic cross-sectional view of a micro-structured waveguide and a guided mode with corresponding refractive index profile of FIG. 22, the top parts of FIGS. 22a and 22b corresponding to a relatively larger cross section of the optical fibre (cf. e.g. FIG. 7c) and the lower parts to a relatively smaller (down tapered) cross section (cf. e.g. FIG. 7e).

Figures 22A, 22B:
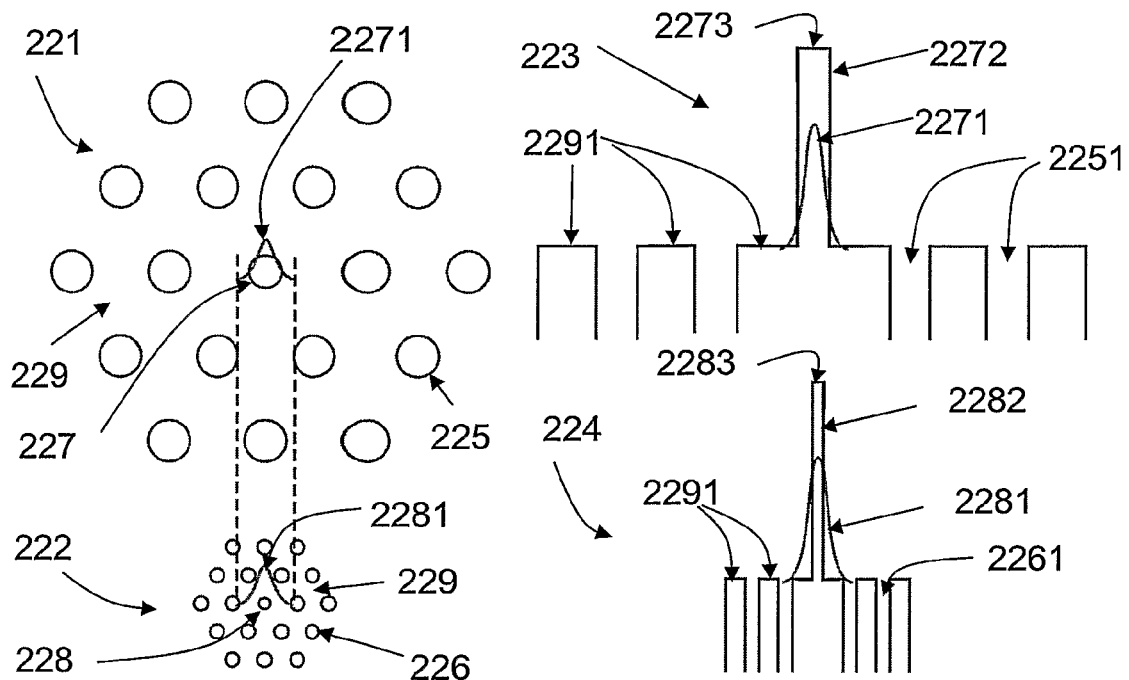
FIG. 22 shows an exemplary schematic cross-sectional view of a micro-structured waveguide with corresponding refractive index profile with a relatively larger and smaller cross section of a tapered part of the optical fibre.

In the following reference numerals for corresponding features of the relatively larger and smaller cross sections, respectively, are given together when referring to a structural feature in general. FIG. 22a shows cross-sectional structural parts of an exemplary LMA PCF (Large Mode Area Photonic Crystal Fibre) having a centrally located core region 227; 228 surrounded by a micro-structured part comprising longitudinally extending air holes 225; 226 dispersed in a cladding background material 229, the top part of FIG. 22a corresponding to a relatively larger cross section 221 and the bottom part to a down tapered, relatively smaller cross section 222. A guided core mode 2271; 2281 is schematically indicated. In the embodiment shown, the geometrical centres of the air holes are distributed in a substantially two dimensionally periodic pattern in the transversal cross sections 221; 222 shown on FIG. 22a. In an embodiment of the invention, as indicated in the index profiles of FIG. 22b, a standard up-doped structure with a step-index core 2272; 2282 placed at the centre is provided. At sufficiently large waveguide dimensions, the light will be guided in the step-index core. When reducing the dimensions, the step-index core will let go of the light, which, however, is caught by the surrounding LMA PCF structure constituted by the pattern of holes 226 in the relatively smaller cross section 222 of FIG. 22a. The core region has a substantially uniform refractive index $n_{core}$ 2273; 2283 with an index step $\Delta n_1$ down to the refractive index $n_{clad}$ 2291 of the cladding background material. The index step $\Delta n_1$ is not changed substantially during the down tapering (i.e. the index levels referred to as 2273 and 2283 are substantially equal). The refractive index levels of holes 225; 226 are indicated by arrows 2251; 2261 (and assumed to be the same). A guided core mode 2271; 2281 is schematically indicated.

Figure 22C:
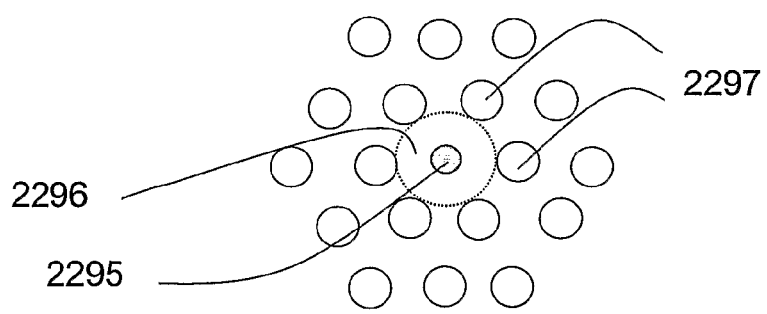

FIG. 22c schematically illustrates the first core region 2295 and the second core region 2296. The first core region is spatially limited by a refractive index difference to the neighbouring region. The first core region 2295 has a refractive index profile designed for single to few mode operation at its relatively larger cross section (e.g. 221 in FIG. 22a). The second core region 2296 is spatially limited by innermost holes 2297 of the cladding region.

In the limit where the mode is guided by the step-index core 227, it should be ensured that the V-parameter $V_{SIF}$ is larger than approximately 1. For robust guiding, it is generally advantageous that $2 < V_{SIF} < 2.405$, where $$V_{SIF} = \frac{2\pi}{\lambda} a \sqrt{n_{core}^2 - n_{clad}^2}$$

a being the core radius and $n_{core}$ and $n_{clad}$ the refractive indices of the core and cladding regions, respectively.

The theoretical mode field radius w relative to the core radius a is given by the following expression:

$$\frac{w}{a} = 0.65 + 1.619 \cdot V_{SIF}^{-\frac{3}{2}} + 2.879 \cdot V_{SIF}^{-6}$$

Figure 23:
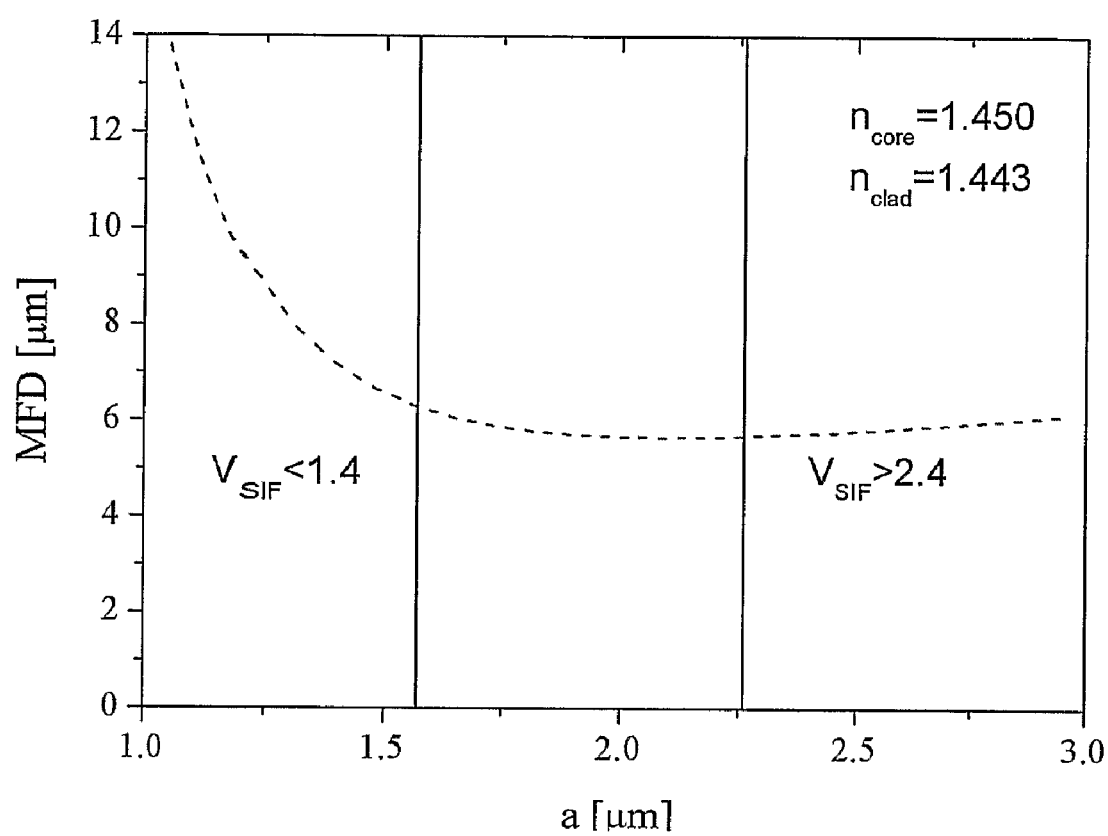
FIG. 23 shows the dependence of mode field diameter MFD of a guided mode on core radius a for an exemplary silica step-index-fibre having $n_{core}=1.450$ and $n_{clad}=1.443$ at a fixed wavelength of $\lambda=1.06$ µm.

For a $V_{SIF}$-value of 1.4, w/a is around 2, indicating that the mode field diameter (=2w) is approximately twice that of the core diameter 2a. The dependence of mode field diameter MFD on core radius a is shown in FIG. 23 for an exemplary silica step-index-fibre having $n_{core}$=1.450 and $n_{clad}$=1.443 at a fixed wavelength of $\lambda$=1.06 μm. Vertical lines in FIG. 23 delimit regions of $V_{SIF}$<1.4 and $V_{SIF}$>2.4, respectively.

One application of the principle of the present invention is to provide sections of signal feed-through in a pump coupler or pump taper component. Such functionality is advantageous when the components are used in connection with double clad optical fibres in an amplifier or laser configuration.

An example is an optical waveguide taper where the cross section of the waveguide is reduced by a factor of 2.7 going from a multimode waveguide of 400 μm cross-sectional (input) diameter to a scaled down (output) diameter of 150 μm. In such a taper, it would be desirable to have a signal feed-through where the input MFD (e.g. 6 μm) is conserved at the output.

Figure 24:
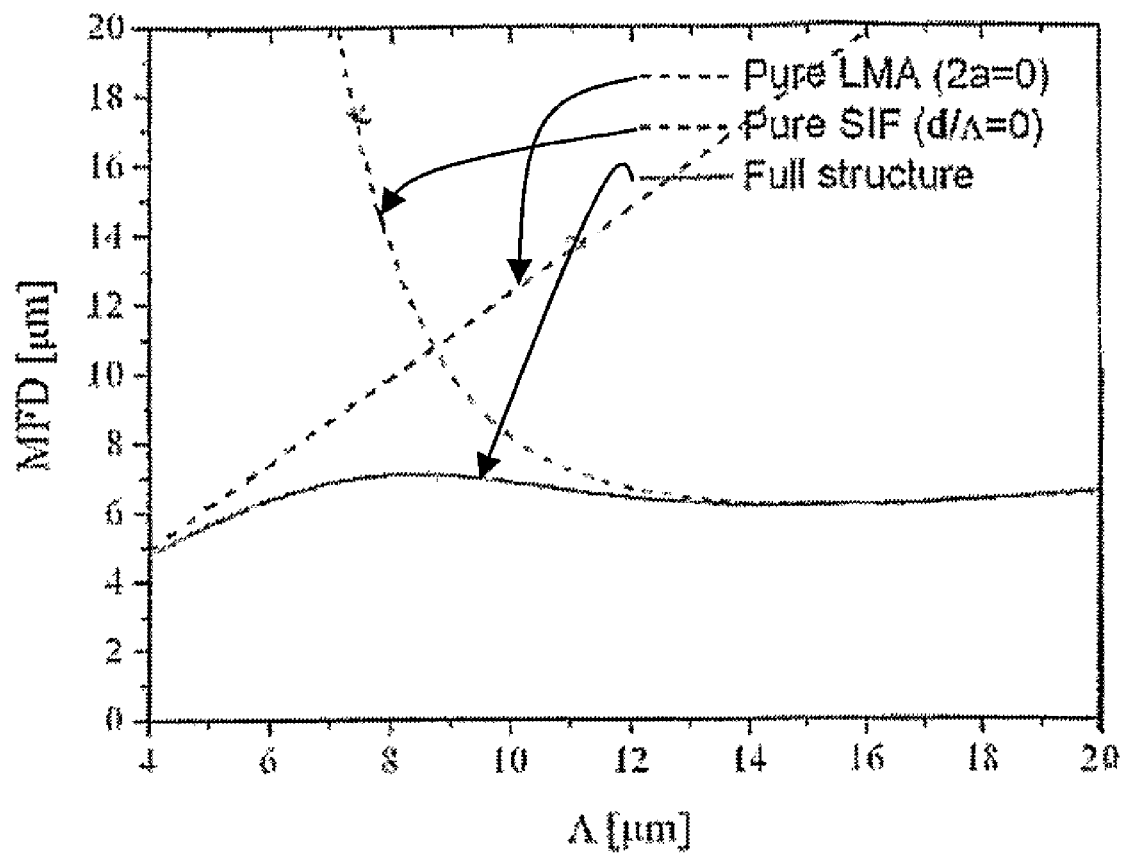
FIG. 24 shows the dependence of mode field diameter MFD on hole pitch Λ for an optical fibre having the schematic cross sectional structure and refractive index profile of FIG. 22

FIG. 24 shows the dependence of mode field diameter MFD on hole pitch $\Lambda$ for an optical fibre having the schematic cross sectional structure and refractive index profile of FIG. 22 (solid curve, termed 'Full structure'). Also indicated in FIG. 24 is the MFD(a) dependence for a pure step-index fibre without micro-structural cladding features (dashed curve, termed 'Pure SIF') and the MFD($\Lambda$) dependence for a pure micro-structured fibre without the step-index-feature (dashed curve, termed 'Pure LMA'). The curves are calculated with the following parameters d/$\Lambda$=0.48, 2a=0.30·$\Lambda$, $n_{core}$=1.450 and $n_{silica}$=1.444. For the pure step-index fibre, the slightly lower effective index of the cladding in the micro-structured fibre is taken into account by setting $n_{clad}$=1.443.

Figure 25:
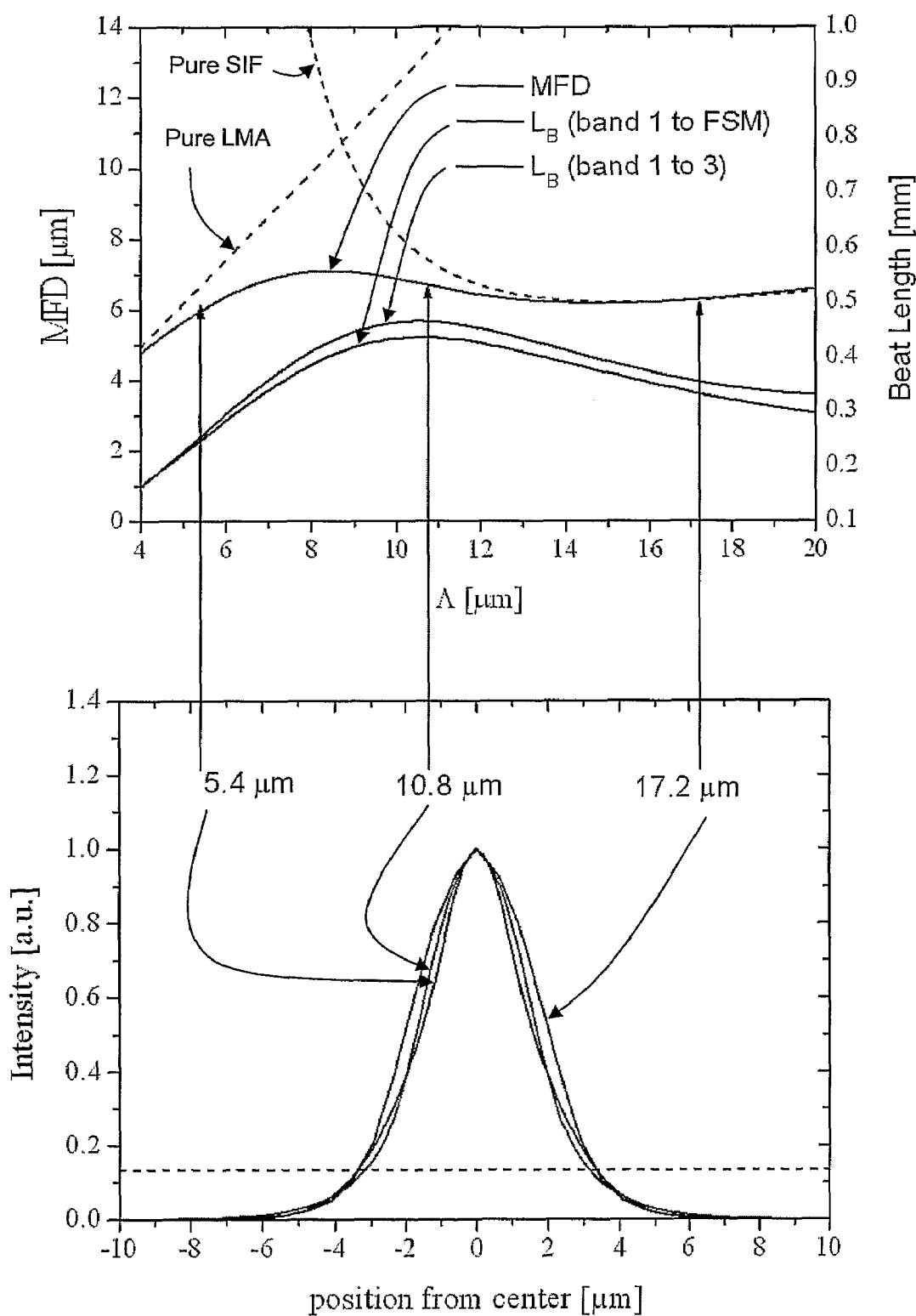
FIG. 25 shows the dependence of mode field diameter MFD and beat length $L_B$ on hole pitch (top graphs) and calculated mode field profiles (bottom graphs) for the optical fibre of FIG. 22.

From FIG. 24 it may be concluded that for the 'full structure' optical fibre of FIG. 22, an MFD approximately equal to 6 μm over the entire pitch range from $\Lambda$=4 μm to $\Lambda$=20 μm is provided. The guiding properties of the pure micro-structured fibre is dominant for pitch dimensions $\Lambda$<8 μm FIG. 25 shows the calculated mode profile for the optical fibre of FIG. 22. The top graph of FIG. 25 shows the dependence of mode field diameter MFD on hole pitch (solid curve, termed 'MFD'). Also indicated in the top graph of FIG. 25 is the MFD(a) dependence for a pure step-index fibre without micro-structural cladding features (dashed curve, termed 'Pure SIF') and the MFD($\Lambda$) dependence for a pure micro-structured fibre without the step-index-feature (dashed curve, termed 'Pure LMA'). Further, the dependence of beat length $L_B$ (right hand scale) on hole pitch $\Lambda$ is shown for optical fibre of FIG. 22. The curve designated '$L_B$ (band 1 to FSM)' shows the beat length between the guided mode and the lowest order cladding mode (fundamental space filling mode, FSM, also known as the cladding index). From the lower graph of FIG. 25, it can be concluded that the profile of the guided mode is approximately constant (and Gaussian) throughout the taper from the relatively larger (input) cross section to the relatively smaller (output) cross section, the three profiles representing pitch dimensions $\Lambda$ of 5.4 μm, 10.8 μm, and 17.2 μm, respectively.

It can thus be concluded that a tapered optical fibre according to the present invention can provide a relatively constant mode field diameter (here around 6 μm) over a relatively large pitch range $\Delta\Lambda$ (here from 20 to 4 μm), i.e. the MFD is relatively independent of the amount of down scaling of the fibre cross section over a relatively large scaling range.

It may, however, be advantageous even to increase the cross-sectional size (area) of the mode field while downscaling the cross section of the optical waveguide, i.e. for an optical waveguide having a substantially circular cross section (such as an optical fibre), it is desirable to have a component wherein the MFD increases when the fibre diameter decreases (e.g. in an input/output coupler, e.g. a fibre taper). Such functionality is e.g. advantageous in cases where pump energy is to be coupled into a double clad, optically active fibre having a relatively large MFD to maximize pump absorption and to reduce non-linearities.

A typical example is a DC-fibre (double clad) with a single mode core having a MFD ~20 μm to be used in an amplifier configuration. A seed source would typically have a MFD ~6 μm (at 1060 nm). Therefore a coupler needs to convert the MFD from 6 μm to 20 μm. As feed-through in a coupler, the structural scale should still be reduced corresponding to an NA change from ~0.22 to ~0.60. I.e., the MFD should increase by a factor of ~3, while the cross-sectional dimensions are decreased by a factor of ~3.

Figure 26A:
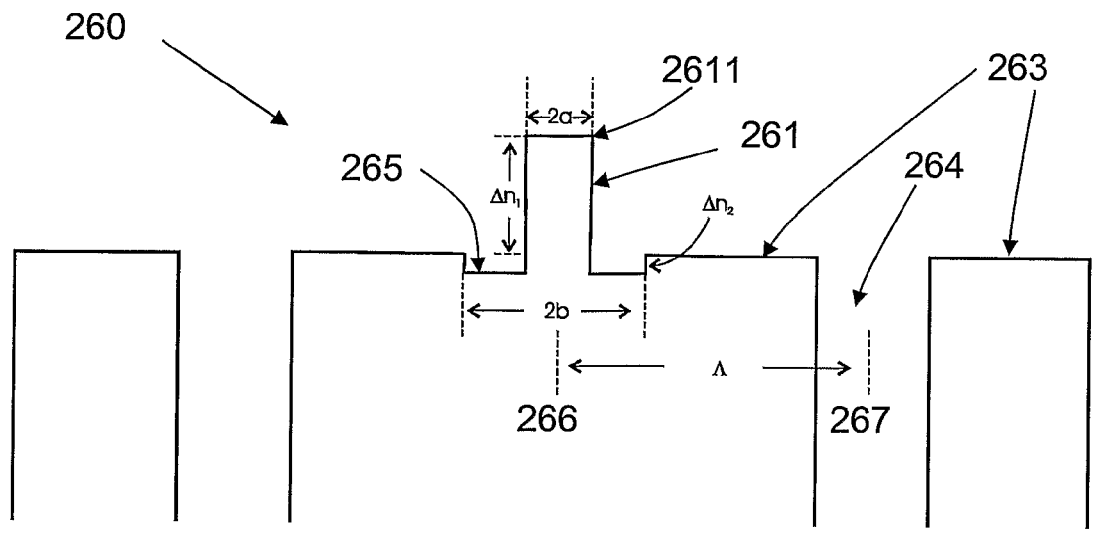
FIG. 26 shows an improved refractive index profile for an optical fibre according to the invention having a step-index core, an intermediate region with a depressed refractive index surrounding the core and a micro-structured cladding surrounding the core and intermediate region.
Figure 26B:
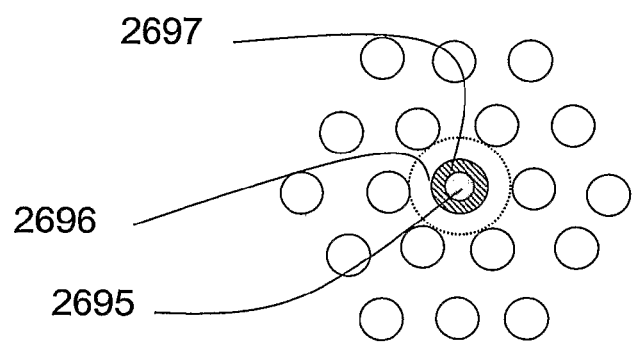

The present inventors have realized that this can more controllably be achieved by an optical fibre having characteristics as indicated on FIG. 22 AND which is additionally provided with an intermediate region 265, 2697 (cf. FIGS. 26a, 26b). In combination, the index profiles of the intermediate region and of the first core region 261, 2695 (cf. FIGS. 26a, 26b) provides an average refractive index value that is substantially matched to the refractive index of the second core region 2696 (cf. FIG. 26b) and the intermediate region to the second core (cf. FIG. 26b). This has the effect of enabling the guiding properties in the small pitch limit to be mainly governed by the properties of the 'pure' micro-structured fibre. Otherwise the updoped first core region (e.g. by Ge-doping) would limit the MFD. FIG. 26 illustrates a modified index profile 260 of FIG. 22 for the central part of the waveguide core and first and second nearest cladding features (here holes). The intermediate region surrounding the (first) core region (the first core region being defined by the high-index region 261 with substantially uniform refractive index 2611 $n_{core}$ of cross-sectional extent 2a having an index step $\Delta n_1$ to the average index level 263 $n_{clad}$ of the cladding background material) is down-doped to a substantially uniform down-doped level 265 $n_{ir}$ providing an index step of $\Delta n_2$ up to the average index level 263 of the cladding background material. The first core region and the down-doped intermediate region surrounding the core region together have a cross-sectional extent of 2b (i.e. a radial extent of b from the centre 266 of the core region). The distance from the centre 266 of the first core region to the centre 267 of the nearest neighbouring cladding feature is (here) assumed to be substantially equal to the centre to centre distance of the nearest cladding features, as indicated by the pitch $\Lambda$. The location of holes is indicated by arrow 264 at the discontinuity of the refractive index profile. In the embodiment shown, the index profile is symmetrically arranged around the centre 266 of the first core region.

Figure 27:
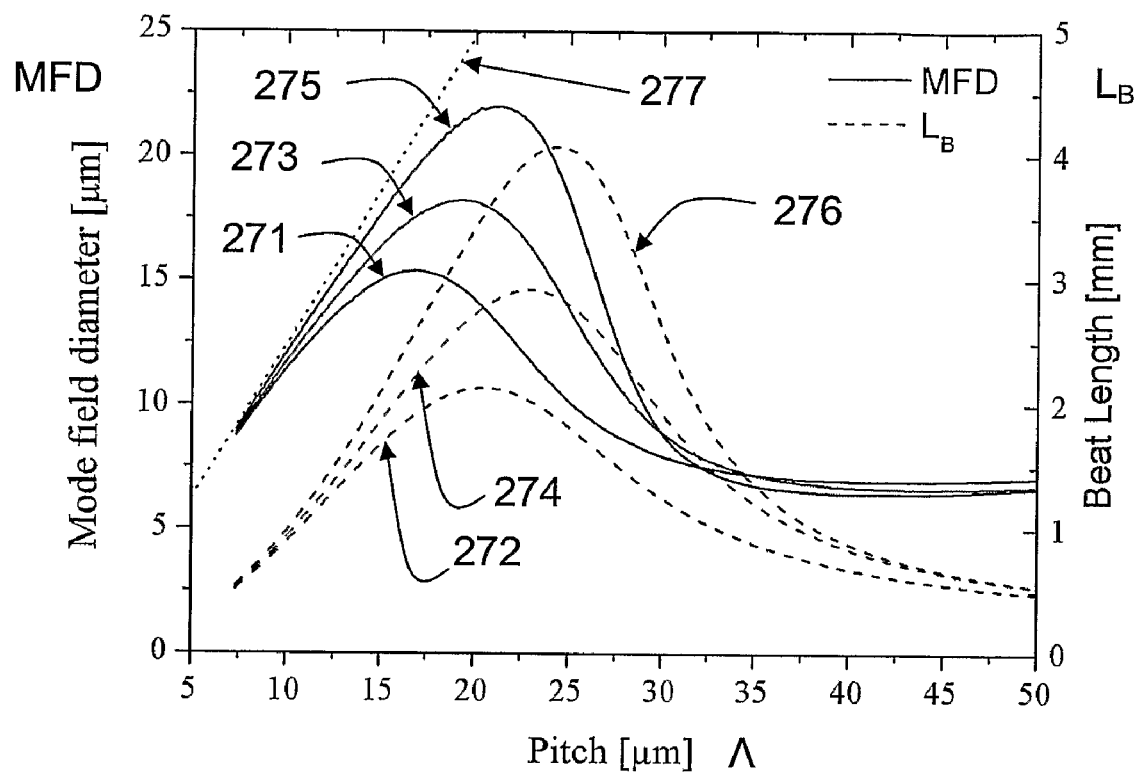
FIG. 27 shows calculated mode field diameters (MFD, solid curves, 271, 273, 275, left scale) and beat lengths ($L_B$, dashed curves, 272, 274, 276, right scale) for optical fibres having index profiles as illustrated by FIG. 26.

FIG. 27 shows calculated mode field diameters (MFD, solid curves, 271, 273, 275, left scale) and beat lengths ($L_B$, dashed curves, 272, 274, 276, right scale) (between band 1 and 3) for index profiles as illustrated by FIG. 26. The fibre parameters for the three sets of curves are indicated in the following table 1:

TABLE 1

Waveguide parameters used for calculations of mode
field diameters MFD and beat lengths $L_B$ of FIG. 27:

| Curves | 2a/$\Lambda$ | $\Delta n_1$ | 2b/$\Lambda$ | $\Delta n_2$ |
|---|---|---|---|---|
| 271, 272 | 0.12 | $6 \cdot 10^{-3}$ | 0 | — |
| 273, 274 | 0.12 | $5 \cdot 10^{-3}$ | 0.22 | $1 \cdot 10^{-3}$ |
| 275, 276 | 0.12 | $5 \cdot 10^{-3}$ | 0.32 | $1 \cdot 10^{-3}$ |

In all cases d/$\Lambda$ = 0.48, where d is a maximum outer dimension (here diameter) of the cladding features (here holes).

The dotted line 277 corresponds to a pure micro-structured fibre with MFD=1.24·$\Lambda$. It is clear from a comparison of FIG. 24 and FIG. 27 that—in the small pitch limit—the depressed cladding surrounding the first core region tends to make the guiding properties of the waveguide more dominated by the properties of the 'pure' micro-structured fibre, whereby the region limited by the intermediate region and the holes of the cladding region defines a second core region (larger than the first core region) determining the guiding properties.

It can further be concluded that a substantial overlap with a 20 µm MFD fibre can be provided. Further, there is a natural compromise between large MFD and potential loss (represented by increased beat length).

The functionality of the index profile of FIG. 26 (being based on a micro-structured waveguide with a doped core region) can alternatively be achieved based on an all solid waveguide (i.e. comprising no micro-structural features such as e.g. air holes). The principle is again to have a central (first) core region—which guides at relatively large structural dimensions—placed in a larger (second) core region not playing a guiding role in this case (at the relatively larger cross section).

Figure 28:
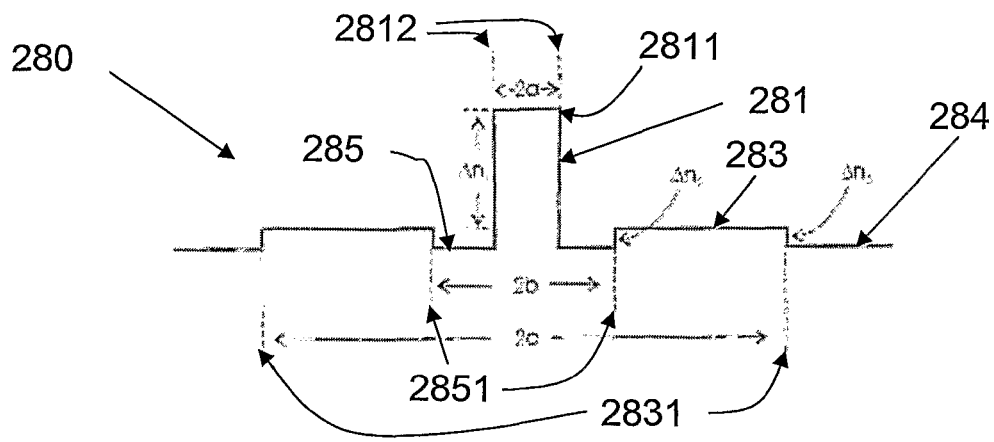
FIG. 28 shows an improved refractive index profile for an optical fibre according to the invention having an all solid central part.

This is illustrated by FIG. 28. The index profile has an inner (first) central high-index core region 281 of cross-sectional extent 2a (as indicated by arrows 2812) having an index step $\Delta n_1$ to an index level 283 of an outer (second) core region surrounding the inner core region 281. The intermediate region between the inner and outer core regions is down-doped to a down-doped level 285 providing an index step of $\Delta n_2$ up to the index level 283 of the outer core region. The outer core region has an index step $\Delta n_3$ down to the refractive index 284 of the surrounding cladding material. The inner core region and the intermediate (depressed cladding) region surrounding the inner core region together have a cross-sectional extent of 2b (as indicated by arrows 2851). The inner and outer core regions, and intermediate down-doped region between them have a cross-sectional extent of 2c (as indicated by arrows 2831). In the embodiment shown, the index profile is symmetrically arranged around the centre of the inner core region.

When the cross-sectional dimensions of the waveguide structure are reduced in scale, the (first) central core stops guiding and the depressed cladding (intermediate region 285 of FIG. 28) ensures that the effective index seen by light matches the index 283 of the (second) outer core. In the down-scaled case, the dimension of the outer core is reduced so that it guides the mode. By having a smaller index step $\Delta n_3$ for the outer (second) core than that $\Delta n_1$ for the inner (first) core, the mode field diameter can be larger for the dimensionally down-scaled structure than for the original structure.

Figure 29:
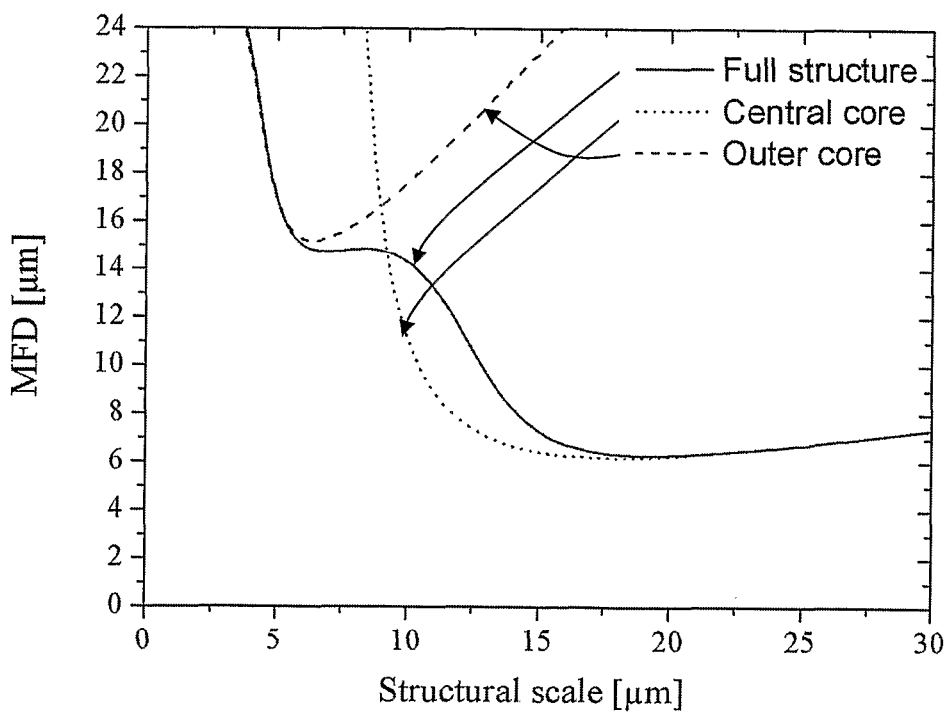
FIG. 29 shows the dependence of mode field diameter MFD on structural scale (core radius a) for an optical fibre having the refractive index profile of FIG. 28.

FIG. 29 shows the dependence of mode field diameter MFD on structural scale (the structural scale relates to the core radius a as ⅛ of the indicated values, i.e. e.g. a structural scale of 24 µm corresponds to a core radius a of 3 µm) for an optical fibre having the refractive index profile of FIG. 28 (solid curve, termed 'Full structure'). Also indicated is the dependence for pure step-index fibres having only the inner central core region (cf. 281 in FIG. 28) (dotted curve, termed 'central core' or first core region) and for a pure step-index fibre having only the outer (second) core region (i.e. core of a diameter 2c having an index of level 283 in FIG. 28) (dashed curve, termed 'outer core'). The curves are calculated with the parameters given in table 2 below:

TABLE 2

Waveguide parameters used for calculations
of mode field diameters MFD of FIG. 29:

| Curve | 2a/$\Lambda$ | $\Delta n_1$ | 2b/$\Lambda$ | $\Delta n_2$ | 2c/$\Lambda$ | $\Delta n_3$ |
|---|---|---|---|---|---|---|
| Full structure, | 0.25 | $5 \cdot 10^{-3}$ | 0.66 | $1 \cdot 10^{-3}$ | 1.75 | $1 \cdot 10^{-3}$ |
| Central (1$^{st}$) core, | 0.25 | $5 \cdot 10^{-3}$ | 0.66 | $1 \cdot 10^{-3}$ | $\infty$ | — |
| Outer (2$^{nd}$) core, | — | — | — | — | 1.75 | $1 \cdot 10^{-3}$ |

From FIG. 29 it may be concluded that for the 'all solid—full structure' optical fibre of FIG. 28, an MFD approximately equal to 6 µm may be expanded to ~15 µm (i.e. an increase of a factor of 2.5), while reducing the cross sectional dimensions of the optical waveguide by a factor of ~3.

THE PRODUCTION PROCESS

Various aspects of manufacturing a photonic crystal fibre including the preparation of a preform is discussed in chapter 4 in [Bjarklev et al.].

The invention is defined by the features of the independent claim(s). Preferred embodiments are defined in the dependent claims.

Some preferred embodiments have been shown in the foregoing, but it should be stressed that the invention is not limited to these, but may be embodied in other ways within the subject-matter defined in the following claims.

The invention claimed is:

1. An optical fibre having a longitudinal, optical axis, and a cross section perpendicular to the longitudinal axis, the optical fibre being adapted to guide light at an operating wavelength $\lambda$, the optical fibre comprising:
    a. a first core region disposed around the longitudinal, optical axis, the first core region exhibiting a predetermined refractive index profile $n_{core-1}$;
    b. a second core region surrounding the first core region, the second core region exhibiting a predetermined refractive index profile $n_{core-2}$;
    c. a cladding region surrounding the second core region and comprising a multitude of longitudinally extending spaced apart micro-structural holes disposed in a cladding material, the cladding material having a refractive index $n_{clad}$, the holes having cross sectional dimensions $d_i(z)$ and mutual centre to centre distances $\Lambda_{ij}(z)$, z being a coordinate along the longitudinal axis of the optical fibre;
    d. a first fibre cross section having a first cross sectional area;
    e. a second fibre cross section having a second cross sectional area which is smaller than the first cross sectional area;
    f. the first and second fibre cross sections being separated by a tapered length of the optical fibre over which the cross-sectional physical dimensions of the fibre, including the micro-structural holes, are tapered down from the first to the second cross section; and
    wherein in the first and second cross sectional areas, the refractive index profiles $n_{core-1}$, $n_{core-2}$ of the first and second core regions, the refractive index $n_{clad}$ of the cladding region and the cross sectional dimensions $d_i$ and mutual centre to centre distances $\Lambda_{ij}$ of the micro-structural holes in the first and second cross sectional areas are adapted, at the operating wavelength, to provide a mode field of a guided mode of the optical fibre with a diameter $MFD_1$ in the first cross section, and a mode field with a diameter $MFD_2$ in the second cross section, and wherein $MFD_2$ is larger than or equal to $MFD_1$.

2. An optical fibre according to claim 1 wherein the micro-structural holes are arranged in a substantially periodic pattern when viewed in a cross section of the optical fibre perpendicular to the longitudinal axis, the periodicity being defined by the location of the centres of the micro-structural holes.

3. An optical fibre according to claim 1 wherein in the second fibre cross section, the cross sectional dimensions of at least innermost holes of the cladding region are larger than zero.

4. An optical fibre according to claim 3 wherein at least the innermost holes have substantially similar ratio of cross sectional dimension to mutual centre to centre distance d/$\Lambda$ at the first and second fibre cross sections.

5. An optical fibre according to claim 1, further comprising an intermediate region surrounding the first core region and being surrounded by the second core region.

6. An optical fibre according to claim 5 wherein the intermediate region is disposed adjacent to the first and second core regions.

7. An optical fibre according to claim 5 wherein the intermediate region exhibits a predetermined refractive index profile $n_{ir}$ and wherein $n_{ir} < n_{core-1}$ and $n_{ir} < n_{core-2}$.

8. An optical fibre according to claim 5 wherein the geometrically averaged refractive index $n_{g,core-1,ir}$ of the first core and intermediate regions is substantially equal to the refractive index $n_{core-2}$ of the second core region.

9. An optical fibre according to claim 1 wherein the refractive index profile of the first core region is a step-index-profile with an index-step $\Delta n_1$ down to the refractive index $n_{core-2}$ of the second core region.

10. An optical fibre according to claim 1 wherein the refractive index profile of the first core region is a step-index-profile with an index-step $\Delta n_{1-clad}$ down to the refractive index of the cladding material $n_{clad}$.

11. An optical fibre according to claim 10 wherein $\Delta n_1$ is identical to $\Delta_{n1-clad}$.

12. An optical fibre according to claim 5 wherein the refractive index profile of the intermediate region is a step-index-profile with an index-step $\Delta n_2$ up to the refractive index $n_{core-2}$ of the second core region.

13. An optical fibre according to claim 5 wherein the refractive index profile of the intermediate region is a step-index-profile with an index-step $\Delta n_{2-clad}$ up to the refractive index of the cladding material $n_{clad}$.

14. An optical fibre according to claim 5 wherein the refractive index profile of the second core region is a step-index-profile with an index-step $\Delta n_3$ down to the refractive index of the surrounding cladding region.

15. An optical fibre according to claim 1 wherein
    a. the first core region has a numerical aperture $NA_{core-1}$ and a cross-sectional dimension $d_{1,core-1}$ in said first fibre cross section, and a cross-sectional dimension $d_{2,core-1}$ in said second fibre cross section;
    b. the second core region has a refractive index $n_{core-2}$, a numerical aperture $NA_{core-2}$ in said second fibre cross section, a cross-sectional dimension $d_{1,core-2}$ in said first cross section, and a cross-sectional dimension $d_{2,core-2}$ in said second fibre cross section;
    c. an outer cladding region surrounding said second core region, said outer cladding region having a refractive index $n_{1,clad}$ or effective refractive index $n_{1,eff,clad}$ in said first fibre cross section and $n_{2,clad}$ or $n_{2,eff,clad}$ in said second fibre cross section;
    d. $n_{core-1} > n_{core-2}$;
    e. $n_{1,clad} < n_{core-2} < 1.002 * n_{1,clad}$; or $n_{1,eff,clad} < n_{core-2} < 1.002 * n_{1,eff,clad}$;
    f. $d_{1,core-1} > 1.3 * d_{2,core-1}$
    g. $d_{2,core-2}$ is larger than or equal to $d_{1,core-1}$;
    h. $2\pi/\lambda * d_{1,core-1}/2 * NA_{core-1}$ is less than 4;
    i. $2\pi/\lambda * d_{2,core-1}/2 * NA_{core-1}$ is less than 2;
    j. $2\pi/\lambda * d_{2,core-2}/2 * NA_{core-2}$ is less than 4.

16. An optical fibre for guiding light at a predetermined wavelength, $\lambda$, and having a longitudinal, optical axis, comprising:

b. a first core region disposed around said longitudinal, optical axis having a refractive index $n_{core-1}$, a numerical aperture $NA_{core-1}$, and dimension $d_{1,core-1}$;

c. a second core region surrounding said first core region, said second core region having a refractive index $n_{core-2}$, and dimension $d_{1,core-2}$;

d. an outer cladding surrounding said second core region, said outer cladding having a refractive index $n_{1,clad}$ or effective refractive index $n_{1,eff,clad}$;

e. $n_{core-1} > n_{core-2}$;

f. $2\pi/\lambda d_{1,core-1}/2 * NA_{core-1}$ in the range from 1.5 to 4;

g. $2\pi/\lambda d_{1,core-2}/2 * NA_{core-2}$ in the range from 2.0 to 28.

17. An article comprising a photonic crystal fibre according to claim 1.

18. An article according to claim 17 wherein the article is a coupler.

19. An article according to claim 17 wherein the article is a fibre amplifier or fibre laser.

20. An optical fiber according to claim 1, wherein the operating wavelength is within the range of 150 nm to 11 μm.

21. An optical fiber according to claim 20, wherein the operating wavelength is 1.06 μm.

22. An optical fiber according to claim 1, wherein the operating wavelength is within the range of 150 nm to 11 μm.

23. An optical fiber according to claim 20, wherein the operating wavelength is 1.06 μm.

24. An optical fibre having a longitudinal, optical axis, and a cross section perpendicular to the longitudinal axis, the optical fibre being adapted to guide light at an operating wavelength λ, the optical fibre comprising:

a. a first core region disposed around the longitudinal, optical axis, the first core region exhibiting a predetermined refractive index profile $n_{core-1}$, a numerical aperture $NA_{core-1}$ and a cross-sectional dimension $d_{1,core-1}$ in said first fibre cross section, and a cross-sectional dimension $d_{2,core-1}$ in said second fibre cross section;

b. a second core region surrounding the first core region, the second core region exhibiting a predetermined refractive index profile $n_{core-2}$;

c. cladding region surrounding the second core region, the cladding region having a refractive index $n_{clad}$;

d. a first fibre cross section having a first cross sectional area;

e. a second fibre cross section having a second cross sectional area which is smaller than the first cross sectional area;

f. the first and second fibre cross sections being separated by a tapered length of the optical fibre over which the cross-sectional physical dimensions of the optical fibre are tapered down from the first to the second cross section; and wherein in the first and second cross sectional areas, the refractive index profiles of the first and second core regions and the refractive index $n_{clad}$ of the cladding region are adapted, at the operating wavelength, to provide a mode field of a guided mode of the optical fibre with a diameter $MFD_1$ in the first cross section, and a mode field with a diameter $MFD_2$ in the second cross section, and wherein $MFD_2$ is larger than or equal to $MFD_1$, and wherein said optical fiber further comprises an intermediate region surrounding the first core region and being surrounded by the second core region.

25. An optical fibre according to claim 24, wherein the refractive index profile of the first core region is a step-index-profile with an index-step $\Delta n_1$ down to the refractive index $n_{core-2}$ of the second core region.

26. An optical fibre according to claim 24, wherein the refractive index profile of the first core region is a step-index-profile with an index-step $\Delta n_{1-clad}$ down to the refractive index $n_{core-2}$ of the cladding material $n_{clad}$.

27. An article comprising a photonic crystal fibre according to claim 24.

28. An article according to claim 27, wherein the article is a coupler.

29. An article according to claim 27, wherein the article is a fibre amplifier or fiber laser.

30. An optical fiber according to claim 24, wherein the operating wavelength is within the range of 150 nm to 11 μm.

31. An optical fiber according to claim 30, wherein the operating wavelength is 1.06 μm.

32. An optical fibre having a longitudinal, optical axis, and a cross section perpendicular to the longitudinal axis, the optical fibre being adapted to guide light at an operating wavelength λ, the optical fibre comprising:

a. a first core region disposed around the longitudinal, optical axis, the first core region exhibiting a predetermined refractive index profile $n_{core-1}$, a numerical aperture $NA_{core-1}$ and a cross-sectional dimension $d_{1,core-1}$ in said first fibre cross section, and a cross-sectional dimension $d_{2,core-1}$ in said second fibre cross section;

b. a second core region surrounding the first core region, the second core region exhibiting a predetermined refractive index profile $n_{core-2}$;

c. cladding region surrounding the second core region, the cladding region having a refractive index $n_{clad}$;

d. a first fibre cross section having a first cross sectional area;

e. a second fibre cross section having a second cross sectional area which is smaller than the first cross sectional area;

f. the first and second fibre cross sections being separated by a tapered length of the optical fibre over which the cross-sectional physical dimensions of the optical fibre are tapered down from the first to the second cross section; and wherein in the first and second cross sectional areas, the refractive index profiles of the first and second core regions and the refractive index $n_{clad}$ of the cladding region are adapted, at the operating wavelength, to provide a mode field of a guided mode of the optical fibre with a diameter $MFD_1$ in the first cross section, and a mode field with a diameter $MFD_2$ in the second cross section, and wherein $MFD_2$ is larger than or equal to $MFD_1$, and wherein i. the first core region has a numerical aperture $NA_{core-1}$ and a cross-sectional dimension $d_{1,core-1}$ in said first fibre cross section, and a cross-sectional dimension $d_{2,core-1}$ in said second fibre cross section;

ii. the second core region has a refractive index $n_{core-2}$, a numerical aperture $NA_{core-2}$ in said second fibre cross section, a cross-sectional dimension $d_{1,core-2}$ in said first cross section, and a cross-sectional dimension $D_{2,core-2}$ in said second fibre cross section;

iii. an outer cladding region surrounding said second core region, said outer cladding region having a refractive index $n_{1,clad}$ or effective refractive index $n_{1,eff,clad}$ in said first fibre cross section and $n_{2,clad}$ or $n_{2,eff,clad}$ in said second fibre cross section;

iv. $N_{core-1} > n_{core-2}$;

v. $n_{1,clad} < n_{core-2} < 1.002 * n_{1,clad}$; or $n_{1,eff,clad} < n_{core-2} < 1.002 * n_{1,eff,clad}$;

vi. $d_{1,core-1} > 1.3 * d_{2,core-1}$ vii. $d_{2,core-2}$ is larger than or equal to $d_{1,core-1}$;

viii. $2\pi/\lambda * d_{1,core-1}/2 * NA_{core-1}$ is less than 4;
ix. $2\pi/\lambda * d_{2,core-1}/2 * NA_{core-1}$ is less than 2;
x. $2\pi/\lambda * d_{2,core-2}/2 * NA_{core-2}$ is less than 4.

33. An optical fibre according to claim 32, wherein the refractive index profile of the first core region is a step-index-profile with an index-step $\Delta n_1$ down to the refractive index $n_{core-2}$ of the second core region.

34. An optical fibre according to claim 32, wherein the refractive index profile of the first core region is a step-index-profile with an index-step $\Delta n_{1-clad}$ down to the refractive index $n_{core-2}$ of the cladding material $n_{clad}$.

35. An article comprising a photonic crystal fibre according to claim 32.

36. An article according to claim 35, wherein the article is a coupler.

37. An article according to claim 35, wherein the article is a fibre amplifier or fiber laser.

38. An optical fiber according to claim 32, wherein the operating wavelength is within the range of 150 nm to 11 μm.

39. An optical fiber according to claim 38, wherein the operating wavelength is 1.06 μm.

* * * * *